(12) United States Patent
Hashimoto et al.

(10) Patent No.: US 8,120,649 B2
(45) Date of Patent: Feb. 21, 2012

(54) MICROSCOPE SYSTEM

(75) Inventors: Yuichiro Hashimoto, Tokyo (JP); Hideyuki Kawanabe, Tokyo (JP); Ryuichi Hirano, Tokyo (JP); Tetsuya Shirota, Tokyo (JP)

(73) Assignee: Olympus Corporation, Tokyo (JP)

( * ) Notice: Subject to any disclaimer, the term of this patent is extended or adjusted under 35 U.S.C. 154(b) by 1507 days.

(21) Appl. No.: 11/593,216

(22) Filed: Nov. 6, 2006

(65) Prior Publication Data

US 2007/0115542 A1     May 24, 2007

(30) Foreign Application Priority Data

Nov. 11, 2005  (JP) .................................. 2005-328159
Oct. 3, 2006  (JP) .................................. 2006-272018

(51) Int. Cl.
   *H04N 9/47*     (2006.01)

(52) U.S. Cl. ................ 348/79; 348/68; 348/69; 348/70; 348/80

(58) Field of Classification Search ............... 348/68–70
See application file for complete search history.

(56) References Cited

U.S. PATENT DOCUMENTS

| | | | |
|---|---|---|---|
| 5,892,458 A | | 4/1999 | Anderer et al. |
| 2002/0113560 A1 * | | 8/2002 | Edwards et al. ............. 315/291 |
| 2003/0076281 A1 * | | 4/2003 | Morgan et al. ............. 345/44 |
| 2004/0001252 A1 | | 1/2004 | Stenzel |
| 2004/0125438 A1 * | | 7/2004 | Studer et al. ............. 359/368 |
| 2004/0212808 A1 * | | 10/2004 | Okawa et al. ............. 356/479 |
| 2006/0140648 A1 * | | 6/2006 | Takegawa ............. 399/12 |
| 2006/0159367 A1 * | | 7/2006 | Zeineh et al. ............. 382/276 |
| 2006/0255140 A1 * | | 11/2006 | Jusas et al. ............. 235/451 |
| 2007/0167247 A1 * | | 7/2007 | Lindsay ............. 473/131 |
| 2008/0207461 A1 * | | 8/2008 | Ermantraut et al. ............. 506/8 |

FOREIGN PATENT DOCUMENTS

| | | |
|---|---|---|
| JP | 05-142481 A | 6/1993 |
| JP | 11-023975 A | 1/1999 |
| JP | 2002-196255 A | 7/2002 |
| JP | 2003-043374 A | 2/2003 |
| JP | 2004-145343 A | 5/2004 |

OTHER PUBLICATIONS

European Office Action dated Jan. 23, 2008, issued in counterpart European Application (4 pages).

* cited by examiner

*Primary Examiner* — Karen Tang
(74) *Attorney, Agent, or Firm* — Holtz, Holtz, Goodman & Chick, PC

(57) ABSTRACT

A microscope system having a selectively mountable optical element, comprises: a first noncontact type storage medium, being equipped in the optical element, for enabling a noncontact readout of information externally; and a first readout unit for reading information non-contactingly from the first noncontact type storage medium, wherein the first noncontact type storage medium stores information related to the optical element.

20 Claims, 17 Drawing Sheets

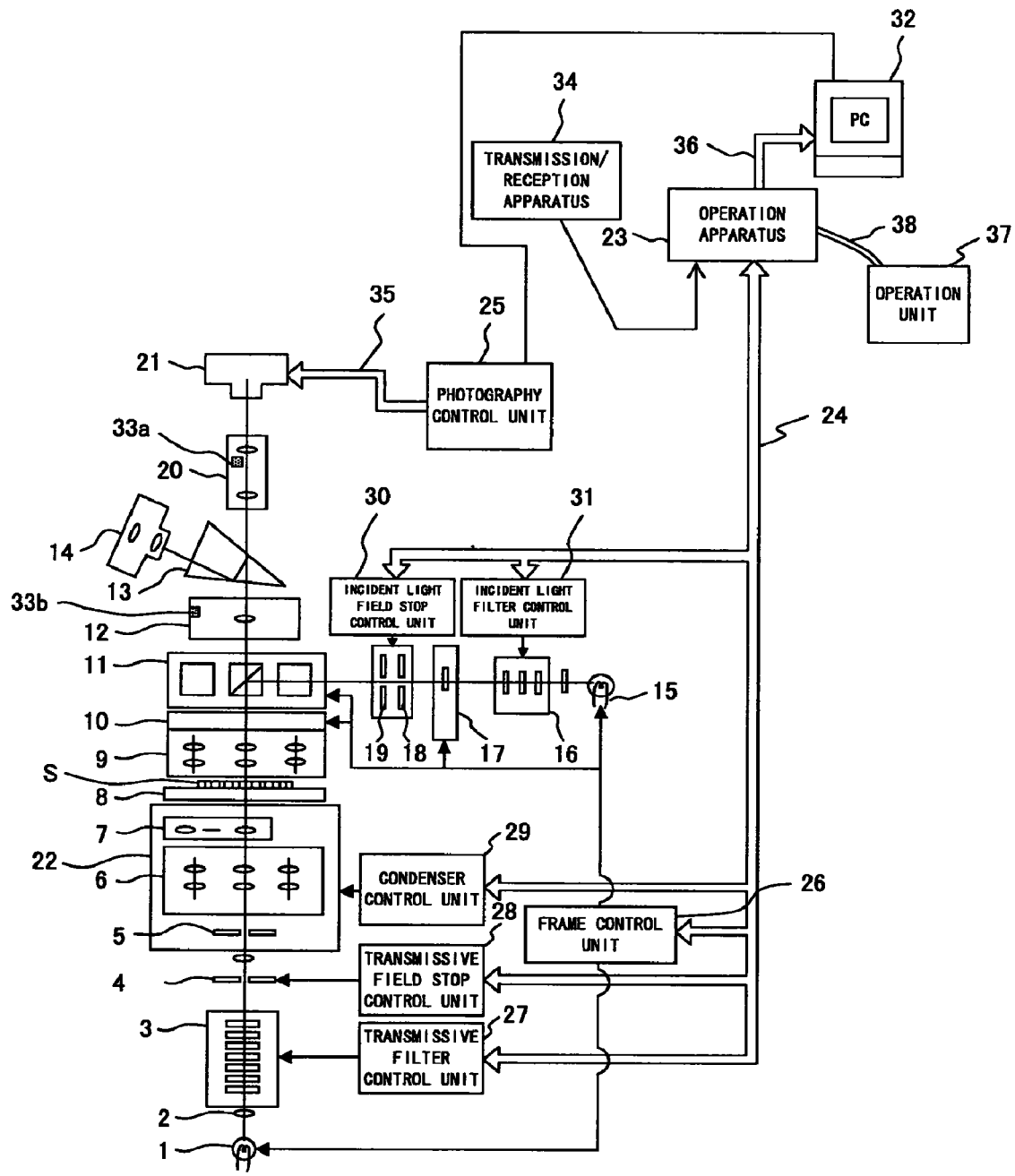
F I G. 1

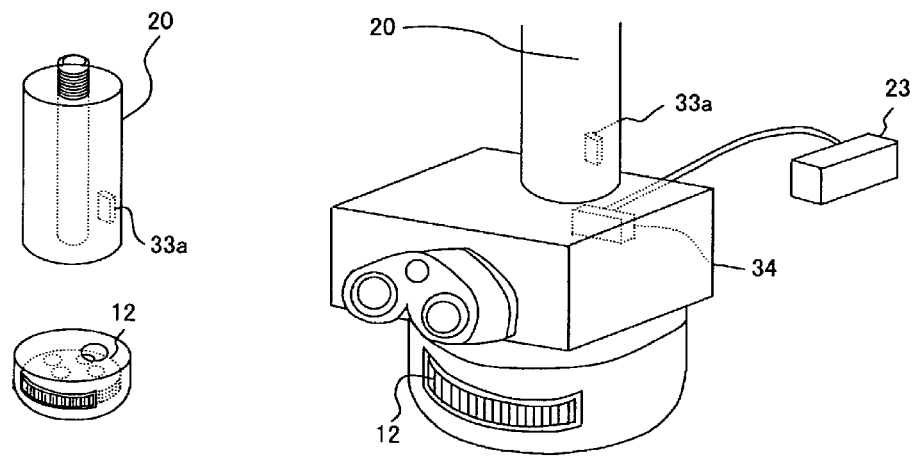
F I G. 4 A
| | PRODUCT NAME | PRODUCTION SERIAL NUMBER | MAGNIFICATION |
|---|---|---|---|
| TV ADAPTOR LENS | U-TV0.25×C | ××××××× | 0.25× |
| INTERMEDIATE LENS TUBE | U-CA | ××××××× | 1× |
F I G. 4 B

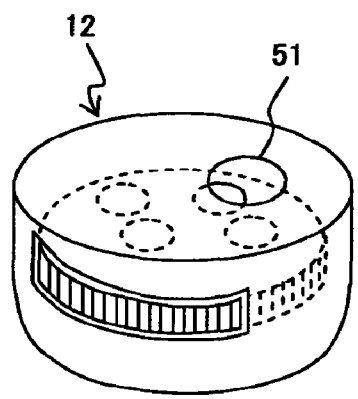
F I G. 5A
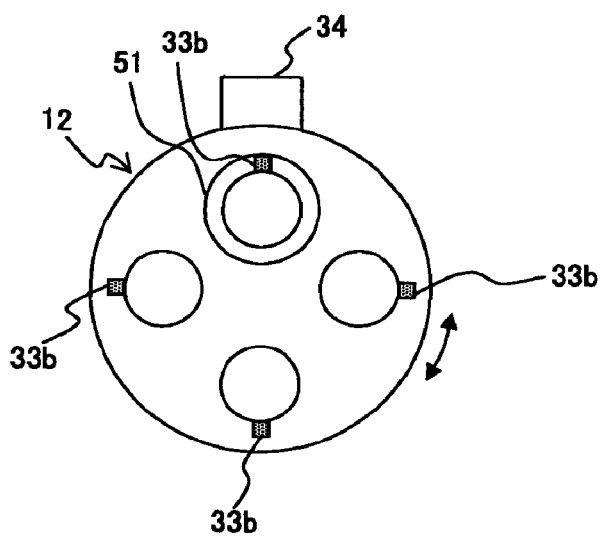
F I G. 5B
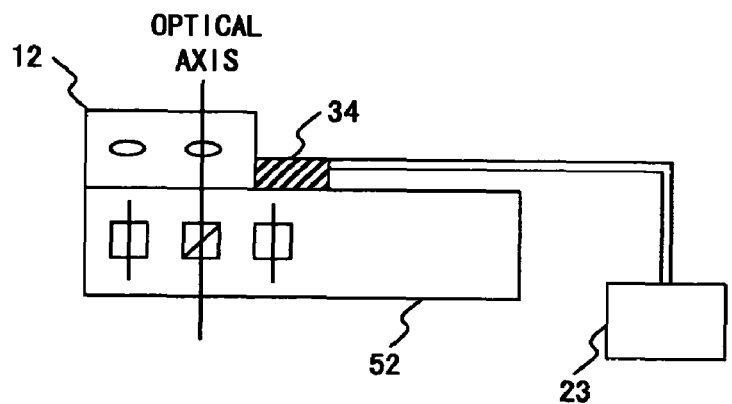
F I G. 5C

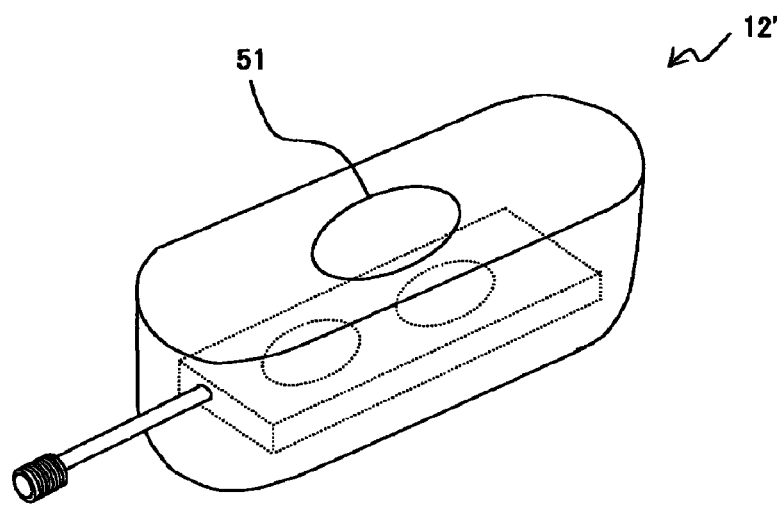
F I G. 6 A
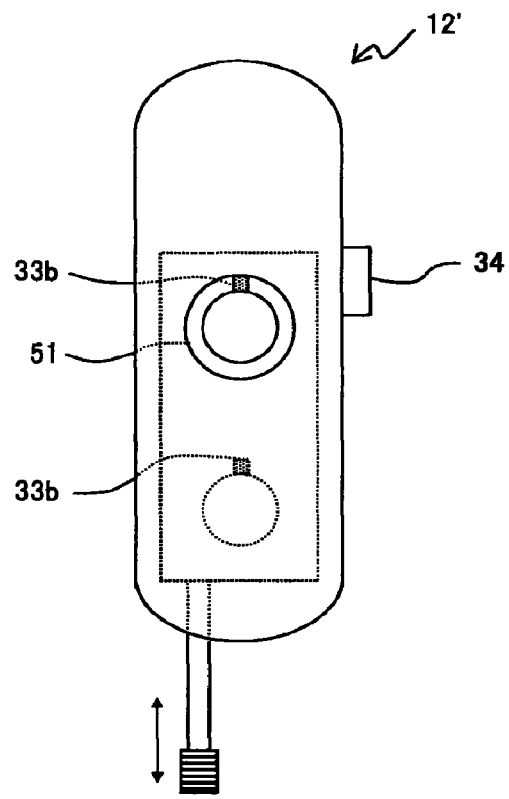
F I G. 6 B

ELECTRONIC MAGNIFICATION TABLE

| CCD | 9-INCH TV | 10-INCH TV | 14-INCH TV | 15-INCH TV | 20-INCH TV | 29-INCH TV |
|---|---|---|---|---|---|---|
| 1/3 | 38.1× | 42.3× | 59.3× | 63.5× | 84.7× | 122.8× |
| 1/2 | 28.5× | 31.8× | 44.5× | 47.6× | 53.5× | 92.1× |
| 2/3 | 20.8× | 23.1× | 32.3× | 34.6× | 46.2× | 67.0× |

F I G.  1 1 A

COMMON CCD SIZES

| CCD | HEIGHT | WIDTH | DIAGONAL |
|---|---|---|---|
| 1/3 | 3.6mm | 4.8mm | 6mm |
| 1/2 | 4.8mm | 6.4mm | 8mm |
| 2/3 | 6.6mm | 8.8mm | 11mm |

F I G.  1 1 B

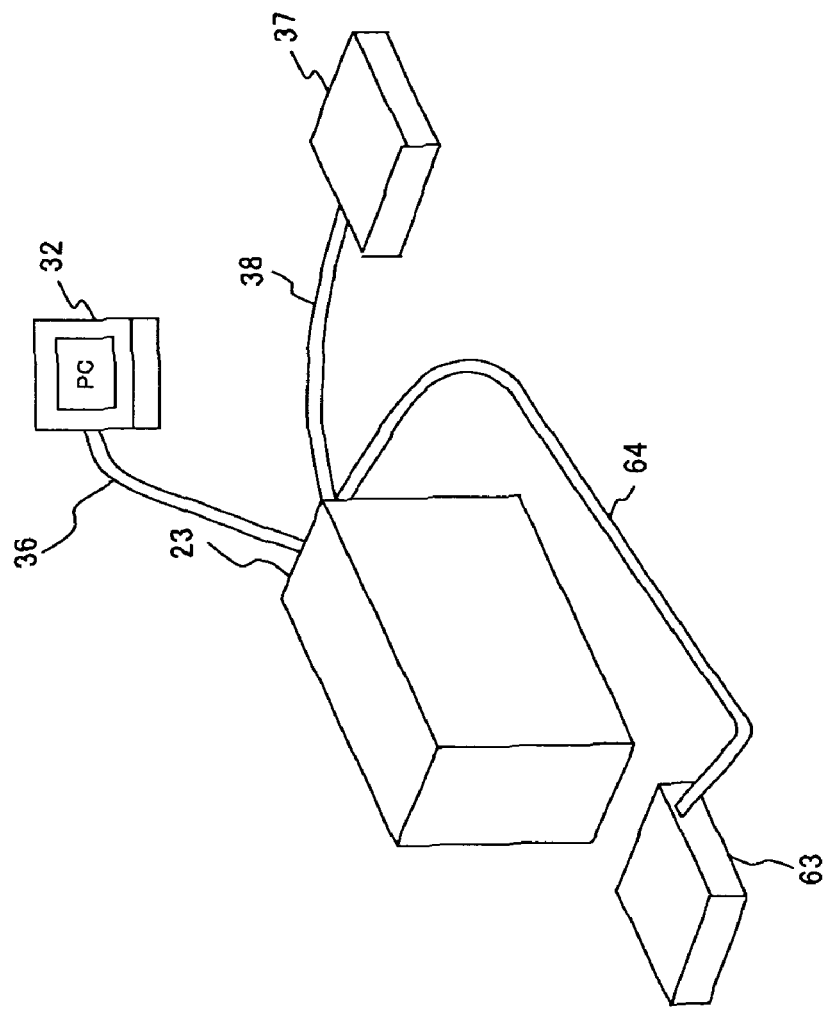
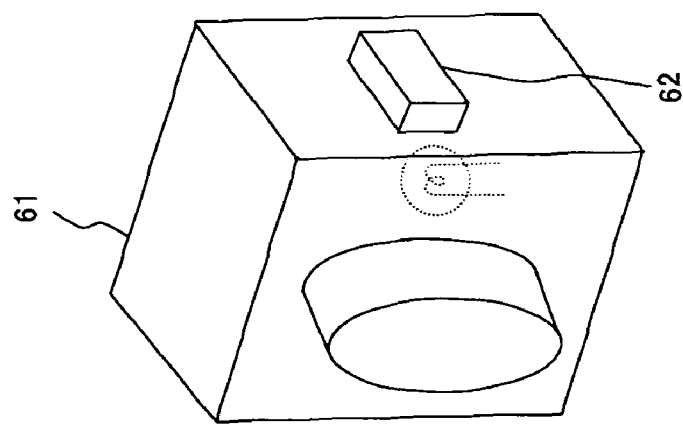
FIG. 13

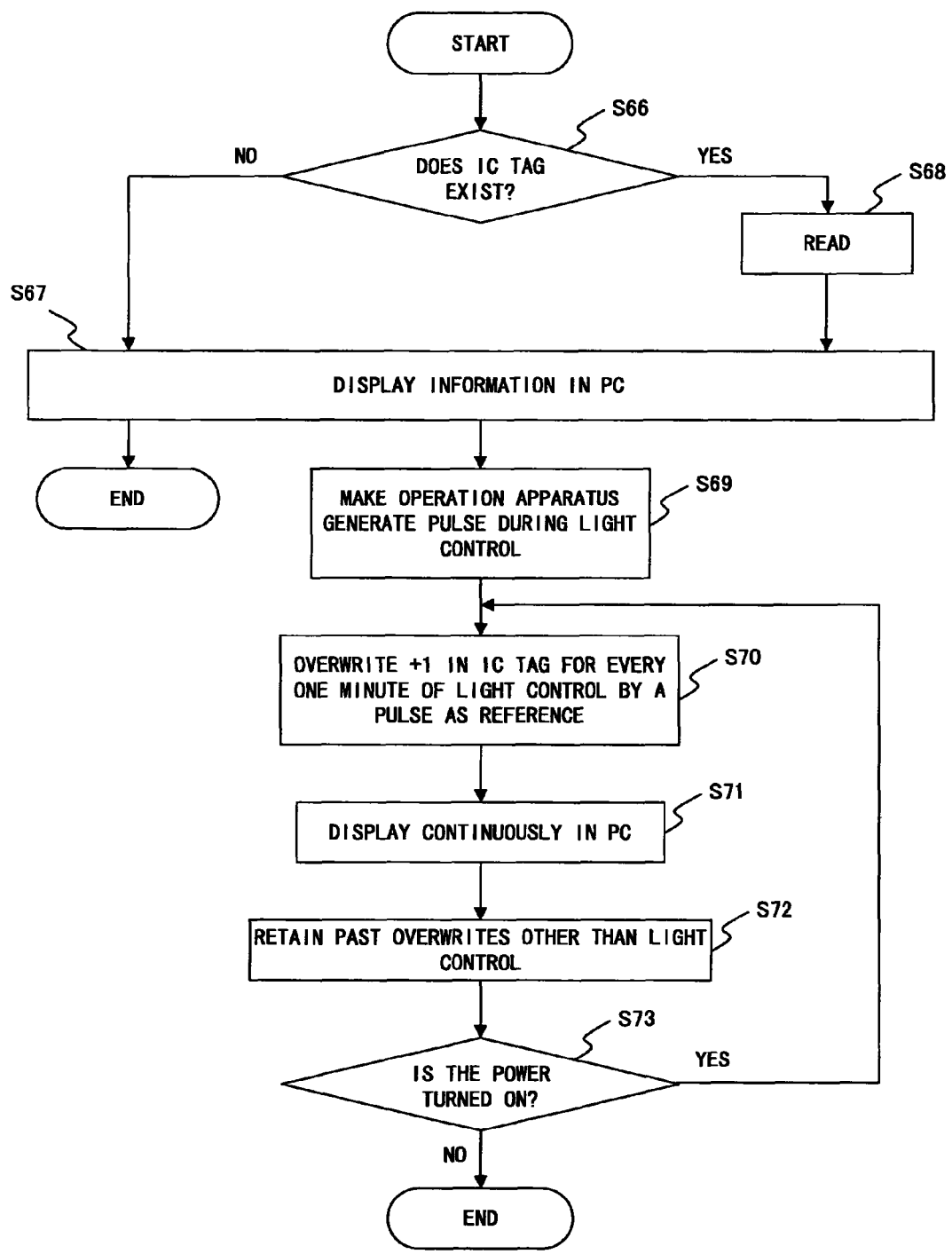
F I G. 1 4

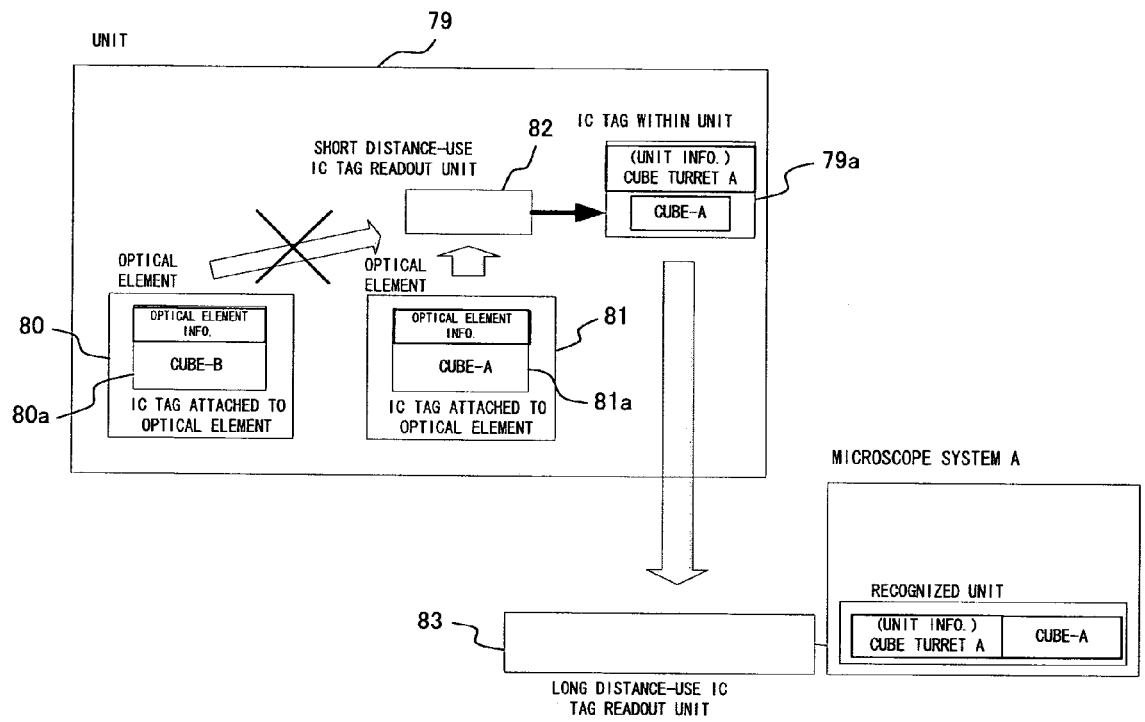
F I G. 17

MICROSCOPE SYSTEM

CROSS REFERENCE TO RELATED APPLICATIONS

This application is based upon and claims the benefit of priority from the prior Japanese Patent Applications No. 2005-328159, filed Nov. 11, 2005, and 2006-272018, filed Oct. 3, 2006, the entire contents of which are incorporated herein by reference.

BACKGROUND OF THE INVENTION

1. Field of the Invention

The present invention relates to a microscope system and in particular to a microscope system enabling a selective mounting of a manual operation unit such as an optical element.

2. Description of the Related Art

A conventional microscope system has a control unit that stores, and controls, information necessary for operations (noted as "operation information" hereinafter) of all electrical operation units such as a starting speed, acceleration and deceleration, operation stroke and operation timing. The control unit recognizes a category of an electrical operation unit connected by way of a cable. An electrical operation unit is controlled according to operation information pre-stored in the control unit. In a modern electrically-operated microscope system, a mounting part of an optical element which is freely interchangeable by a user is also electrically operated, enabling the user, merely by an operation, to direct a desired optical element to, or instruct an operation of it in, an optical path which is set by him/herself. There is, however, a problem that the user him/herself must perform an input and a setup, both in the control unit for configuring an optical element at an initial setup. That is, the microscope system has not been capable of recognizing a configuration of an optical element at the time of turning the power on, while it is capable of controlling an electrical operation unit thereat.

Accordingly conceived for solving the above described problem is a microscope system using a storage medium enabling a noncontact reading and writing of information (named as "noncontact storage medium" hereinafter).

For example, a patent document 1 has disclosed a microscope system enabling a user to recognize information of an object lens at the time of turning on the power without his/her own input by equipping a noncontact storage medium which stores information of an object lens corresponding to the present object lens.

A patent document 2 has disclosed a microscope system enabling a user to recognize information of an optical element at the time of turning on the power without his/her own input by equipping a noncontact storage medium which stores information of an optical element corresponding to the present optical element.

The microscope systems disclosed by these patent documents are configured to be capable of recognizing an optical path and how a setup is carried out at the time of turning the power on by equipping a noncontact storage medium.

Another known concept is a microscope system performing a setup for photographing by using information stored in a storage medium.

For example, a patent document 3 has disclosed a microscope system capable of reading a photographing condition from a storage medium and setting up accordingly. The setup information read from the storage medium is information of an electrical operation unit. The storage medium also stores, in addition to the aforementioned information, pieces of information, such as a dyeing method for a sample, category of a light source and photographed date and time. An internal memory also stores setup information to some extent, enabling an automatic setup of a unit to the light path by selecting a setup condition close to the stored setup information. Meanwhile, such setup information allows a modification, thus enabling a customization for a specific user.

In the microscope systems disclosed in the above noted patent documents, however, the noncontact storage medium and storage medium are specialized for the functions of reading information of the optical element and electrical operation unit disclosed in the patent documents. The user wishes to eventually obtain an observation image with ease and a high reproducibility by way of a large number of optical elements and photographing systems. In order to fulfill such a wish, it is necessary to obtain not only the information of the optical element and electrical operation unit which are disclosed in the patent document, but also information of other units, e.g., manual operation units including a microscope tube, adaptor, et cetera.

[Patent document 1] Laid-Open Japanese Patent Application Publication No. 2002-196255
[Patent document 2] Laid-Open Japanese Patent Application Publication No. 2004-145343
[Patent document 3] Laid-Open Japanese Patent Application Publication No. H05-142481

SUMMARY OF THE INVENTION

According to a first aspect of the present invention, a microscope system having a selectively mountable optical element comprises: a first noncontact type storage medium, being equipped in the optical element, for enabling a noncontact readout of information externally; and a first readout unit for reading information non-contactingly from the first noncontact type storage medium, wherein the first noncontact type storage medium stores information related to the optical element.

According to a second aspect of the present invention, a microscope system, in the first aspect, further comprises a display unit for displaying information read by the first readout unit, wherein the display unit displays information which is read by the first readout unit and which is related to the optical element.

According to a third aspect of the present invention, a microscope system, in the first aspect, further comprises a second noncontact type storage medium, being equipped in a unit requiring a replacement when a total usage time elapses a predefined length of time, for enabling a noncontact readout, and a noncontact write, of information externally, and a read/write unit for reading and writing information from and to the second noncontact type storage medium, wherein the read/write unit reads and writes a total usage time of the unit from and to the second noncontact type storage medium, and the display unit displays a total usage time of the unit which is read by the read/write unit.

According to a fourth aspect of the present invention, a microscope system, in the first aspect, further comprises a write unit for writing group information unique to the microscope system non-contactingly to the first noncontact type storage medium, and a judgment unit for judging whether or not the group information, which is read by the first readout unit along with the information related to the optical element, is identical with the group information unique to the microscope system, wherein the information related to the optical element read by the first readout unit is not used if the judgment unit judges that the two kinds of group information are not identical.

According to a fifth aspect of the present invention, a microscope system, in the first aspect, has the first noncontact type storage medium further store information unique to the optical element, and further comprises a second readout unit for reading information unique to the optical element non-contactingly from the first noncontact type storage medium, a registration unit for registering the information unique to the optical element read by the second readout unit, and a judgment unit for judging whether or not information unique to the optical element read by the first readout unit along with information related to the optical element is registered by the registration unit, wherein the information related to the optical element read by the first readout unit along with the information unique to the optical element is not used if the judgment unit judges that the information unique to the optical element is not registered.

According to a sixth aspect of the present invention, a microscope system, in the first aspect, further comprises an optical element unit comprising a plurality of the optical elements, a second noncontact type storage medium, being equipped in the optical element unit, for enabling a noncontact readout externally, and a second readout unit for reading information non-contactingly from the second noncontact type storage medium, wherein the first readout unit reads information related to an optical element which is in use from the first noncontact type storage medium equipped in the optical element from among the plurality of optical elements comprised by the optical element unit, the second noncontact type storage medium stores the information related to the optical element read by the first readout unit, and the second readout unit reads information related to the optical element from the second noncontact type storage medium.

BRIEF DESCRIPTION OF THE DRAWINGS

FIG. 1 is a diagram showing an overall comprisal of a microscope system according to an embodiment 1;

FIG. 4A is an illustration diagram of a television (TV) adaptor lens and of an intermediate lens tube equipped with respective IC tags;

FIG. 4B is a diagram showing setup information, which is read from respective IC tags, of a TV adaptor lens and of an intermediate lens tube;

FIG. 5A is a first diagram describing an example of attaching IC tags to an intermediate lens tube comprising a plurality of optical elements of intermediate magnifications mounted into the mounting holes of the inside of a turret form;

FIG. 5B is a second diagram describing an example of attaching IC tags to an intermediate lens tube comprising a plurality of optical elements of intermediate magnifications mounted into the mounting holes of the inside of a turret form;

FIG. 5C is a third diagram describing an example of attaching IC tags to an intermediate lens tube comprising a plurality of optical elements of intermediate magnifications mounted into the mounting holes of the inside of a turret form;

FIG. 6A is a first diagram describing an example of attaching IC tags to an intermediate lens tube that is a push lever-featured magnification change apparatus;

FIG. 6B is a second diagram describing an example of attaching IC tags to an intermediate lens tube that is a push lever-featured magnification change apparatus;

FIG. 11A is a diagram showing an electronic magnification table;

FIG. 11B is a diagram showing a table of common charge coupled device (CCD) sizes;

FIG. 13 is a diagram showing a partial comprisal of a microscope system according to an embodiment 3;

FIG. 14 is a flow chart related to a process for reading and writing a lamp lighting time from and to an IC tag;

FIG. 17 is a diagram describing a specific example in the case of reading only information of an optical element currently in use from among a unit comprising a plurality of optical elements.

DESCRIPTION OF THE PREFERRED EMBODIMENTS

Figure 2:
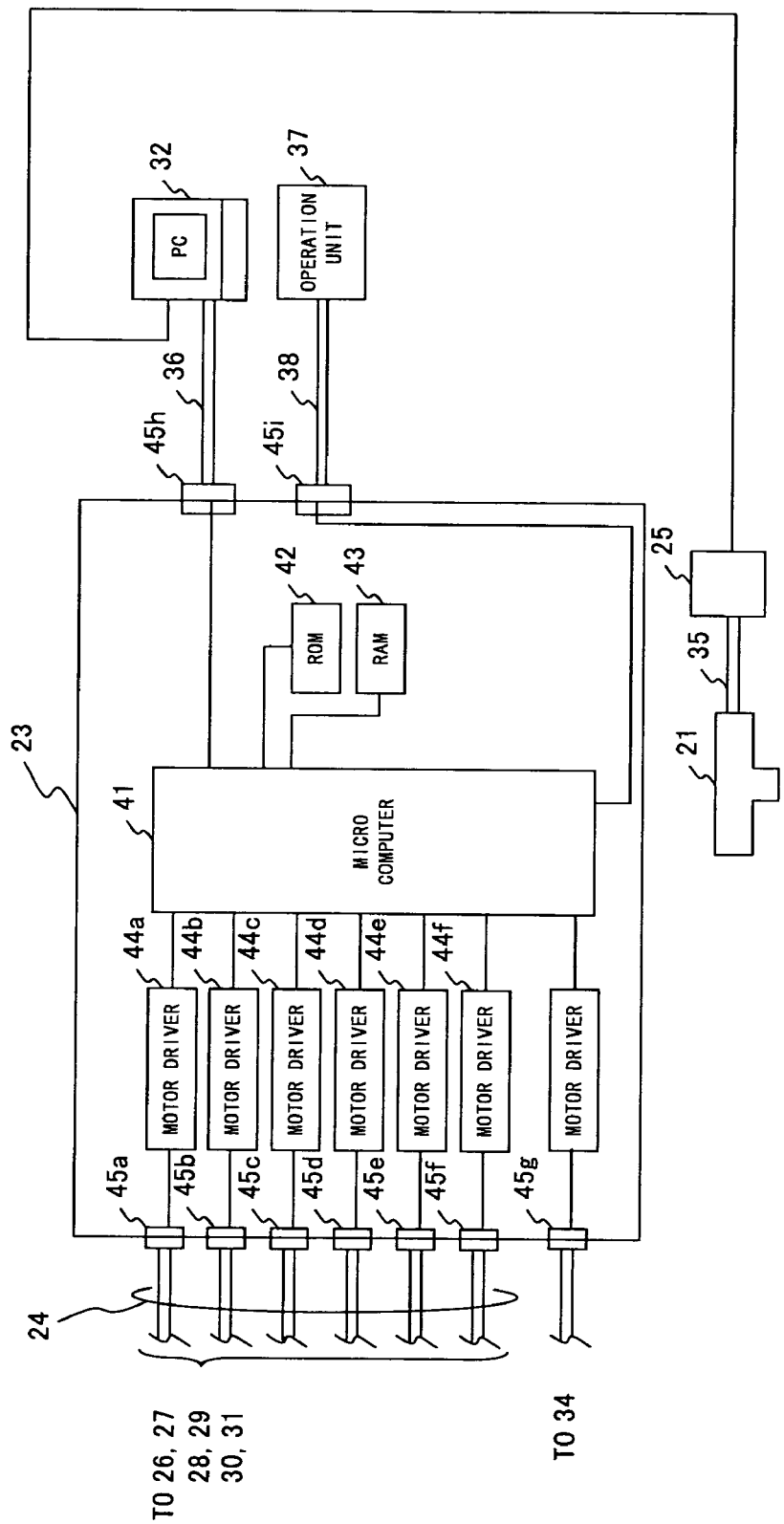
FIG. 2 is a diagram showing a further detail of a comprisal of a control system of a microscope system according to the embodiment 1.

The following is a description of the preferred embodiment of the present invention by referring to the accompanying drawings.

Embodiment 1

FIG. 1 is a diagram showing an overall comprisal of a microscope system according to an embodiment 1.

Note that the microscope system according to the present embodiment is an electrically operated microscope system furnished with a manual operation unit which is equipped with a radio frequency IC tag (which is described in detail later; simply noted as "IC tag" hereinafter).

The first is a description on the outline of an overall comprisal of the microscope system according to the present embodiment.

Referring to FIG. 1, an optical system of the microscope system according to the present embodiment collects a light from a transmission illumination-use light source 1 constituted by a halogen lamp, for example, by means of a collector lens 2 and lets it incident to a transmission illumination-use filter unit 3.

The transmission illumination-use filter unit 3 comprises plural pieces of neutral density (ND) filters adjusting a brightness of the transmission illumination-use light source 1 without changing a color temperature thereof, and plural pieces of correction filters for color corrections, being configured to enable a selective insertion and extraction of discretionary filters into and out of the light path of the illumination optical system.

An illumination light transmitting through the transmission illumination-use filter unit 3 transmits itself through a transmission illumination-use field stop 4, a transmission illumination-use aperture stop 5, a condenser optical element unit 6 and a condenser top lens unit 7 for illuminating an observation sample S placed on a sample stage 8 from the underneath thereof.

Note that the condenser optical element unit 6 is constituted by a plurality of units (i.e., three units according to the present embodiment) which are selectively inserted to the light path, and the condenser top lens unit 7 is constituted by a plurality of units (i.e., two units according to the present embodiment) which are selectively inserted to the light path. The sample stage 8 is configured to be capable of moving the observation sample S in two dimensions within a plane perpendicular to the optical axis and also in the axis direction for focusing. The transmission illumination-use aperture stop 5, condenser optical element unit 6 and condenser top lens unit 7 constitute a condenser 22.

A plurality of object lenses (i.e., three thereof according to the present embodiment) is retained by a revolver 10 positioned above the sample stage 8. The revolver 10 is configured to enable an exchange of an object lens to be inserted to the optical axis within the observation light path by rotating itself. The revolver 10 is mounted onto the end of an arm of the microscope for example, and a cube unit 11 is equipped on the observation light path at the end of the arm. The cube unit 11 is constituted by a plurality of units (i.e., three units according to the present embodiment) which is selectively inserted to the light path according to various microscopic examination methods. The cube unit 11 is configured to allow an insertion into the light path by a selection made through microscope-use software (simply noted as "software" hereinafter) operable in an operation unit 37 and a personal computer (PC) 32. The light transmitting through the cube unit 11 is incident to an intermediate lens tube 12 which is detachably attachable, having the roles of branching the light path and of changing magnifications. The assumption is that the intermediate lens tube 12 according to the present embodiment is configured to set an optical element of an intermediate magnification of 1× fixedly in the light path. The light transmitting through the intermediate lens tube 12 is branched to two directions by means of a beam splitter 13, with one observation light of them being led to an eye piece lens 14, while the other being led to a photography-use light path.

Meanwhile, a light from an epi-illumination-use light source 15 constituted by a mercury lamp, et cetera, is transmitted through an epi-illumination-use filter unit 16, an epi-illumination-use shutter 17, an epi-illumination-use field stop 18 and an epi-illumination-use aperture stop 19, and incident to a unit which is inserted into the light path of the cube unit 11, for incident-illuminating the observation sample S by being reflected thereon.

The epi-illumination-use filter unit 16 is constituted by plural pieces of ND filters for adjusting a brightness of the epi-illumination-use light source 15 without changing a color temperature thereof and plural pieces of correction filters for color corrections.

Meanwhile, an observation light to a photography-use light path branched by the beam splitter 13 is incident to a digital camera 21 by way of a TV adaptor lens 20 for adjusting the magnification for photography-use arbitrarily. The digital camera 21 is connected to a photography control unit 25 by way of a cable 35, while the photography control unit 25 is connected to the PC 32 by way of a cable so as to enable the PC 32 to store photographed information.

The following description is on a comprisal of a control system of the microscope system according to the present embodiment.

Referring to FIG. 1, connected to an operation apparatus 23 for controlling the operation of the entirety of the microscope system by way of a plurality of dedicated cable 24 are a frame control unit 26, a transmission illumination-use filter control unit 27, a transmission illumination-use field stop control unit 28, a condenser control unit 29, an epi-illumination-use field stop control unit 30 and an epi-illumination-use filter control unit 31.

The frame control unit 26 is configured to drive and control the transmission illumination-use light source 1, epi-illumination-use light source 15, revolver 10, cube unit 11 and epi-illumination-use shutter 17.

The transmission illumination-use filter control unit 27 drives and controls the transmission illumination-use filter unit 3. The transmission illumination-use field stop control unit 28 drives and controls the transmission illumination-use field stop 4.

The condenser control unit 29 drives and controls the condenser optical element unit 6, condenser top lens unit 7 and transmission illumination-use aperture stop 5.

The epi-illumination-use field stop control unit 30 drives and controls the epi-illumination-use field stop 18 and epi-illumination-use aperture stop 19. The epi-illumination-use filter control unit 31 drives and controls the epi-illumination-use filter unit 16.

The PC 32 and operation unit 37 are also connected to the operation apparatus 23 which controls the individual control units according to instructions from the PC 32 or operation unit 37.

The photography control unit 25 is connected to the PC 32. The photography control unit 25, being connected to the digital camera 21 by way of the cable 35, performs a control of a photographing condition, image processing, an obtainment of a photographed image and a storage thereof of the digital camera 21.

The next description is on a configuration relating to reading information of a manual operation unit that is a characteristic of the microscope system according to the present embodiment.

Referring to FIG. 1, the TV adaptor lens 20 and intermediate lens tube 12, which are manual operation units, are equipped with IC tag 33a and 33b, as noncontact type storage media, respectively. Note that an IC tag is internally equipped with an IC chip, antennal, et cetera, being enabled for a retention of information and a wireless external transmission and reception thereof. Incidentally, the power source is not comprised because the power is supplied by means of a non-contact power transmission technique.

The IC tag 33a retains, as detail information of the TV adaptor lens 20, the product name, magnification and production serial number. And the IC tag 33b retains, as detail information of the intermediate lens tube 12, the product name, magnification and production serial number.

A transmission/reception apparatus 34 is configured to be capable of communicating with an IC tag by means of a noncontact power transmission technique. The transmission/reception apparatus 34 activates an IC tag by transmitting radio waves thereto, and reads information stored in the IC tag. The IC tag activates itself by extracting a minute current from the radio wave transmitted from the transmission/reception apparatus 34. The transmission/reception apparatus 34 is connected to the operation apparatus 23, and connected to the PC 32 by way thereof. The information read from the IC tag by the transmission/reception apparatus 34 is transmitted to the operation apparatus 23 and stored therein, followed by being exported to the PC 32 according to an instruction from software operating in the PC 32.

The next is a detailed description of a comprisal of the control system of the microscope system according to the present embodiment.

FIG. 2 is a diagram showing a further detail of the comprisal of the control system.

Referring to FIG. 2, the operation apparatus 23 comprises a microcomputer 41 administering an electrical drive control of the present system, read only memory (ROM) 42 for storing a control program, random access memory (RAM) 43 for securing data of variables of the control program, six motor drivers 44 (i.e., 44a, 44b, 44c, 44d, 44e and 44f), nine external interface connectors 45 (45a, 45b, 45c, 45d, 45e, 45f, 45g, 45h and 45i).

Each motor driver 44 connected to the microcomputer 41 is connected to each corresponding external interface connectors 45 which is then connected to each corresponding control unit by way of each corresponding cable 24.

The microcomputer 41 drives motors, by way of respective motor drivers 44, of the frame control unit 26, transmission illumination-use filter control unit 27, transmission illumination-use field stop control unit 28, condenser control unit 29, epi-illumination-use field stop control unit 30 and epi-illumination-use filter control unit 31, and is enabled to drive and control respective units.

The microcomputer 41 is also connected to the transmission/reception apparatus 34 by way of the external interface connector 45g, being enabled to directly process information of an IC tag read by the transmission/reception apparatus 34.

Note that the microcomputer 41 is also configured to obtain an address indicating a motor rotation angle of a corresponding control unit from each of the motor drivers 44a through 44f, store it in the RAM 42 and monitor the current position of the corresponding unit.

The external interface connectors 45h and 45i which are connected to the microcomputer 41 are respectively connected to the PC 32 and operation unit 37 by way of the cables 36 and 38, respectively. A simple instruction for each electrical drive control is transmitted from the operation unit 37, while a high level instruction therefor is transmitted from the PC 32, so that the microcomputer 41 carries out the corresponding process according to these levels of instructions.

The next is a description of a process for reading an IC tag performed by the microcomputer 41 comprised by the operation apparatus 23.

Figure 3:
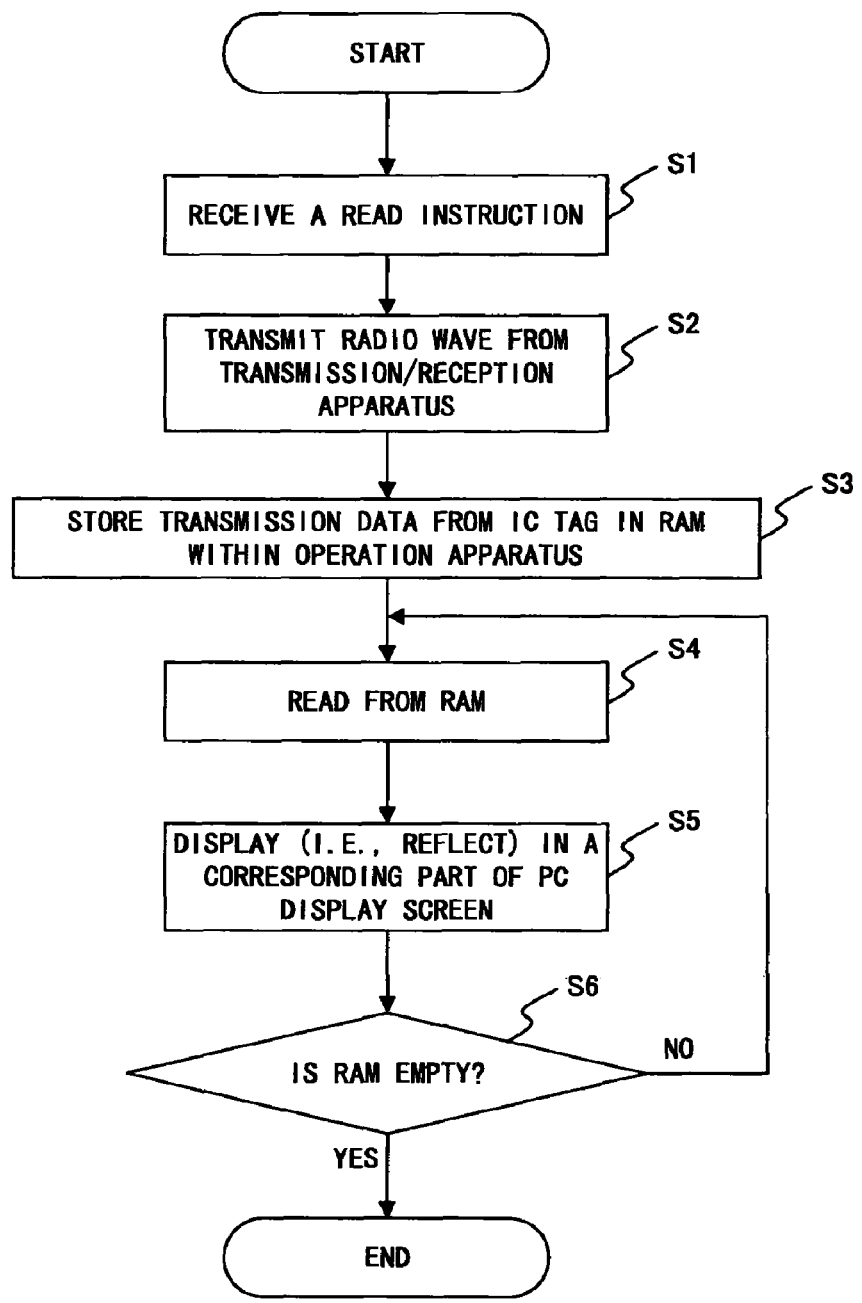
FIG. 3 is a flow chart relating to a read process of an integrated circuit (IC) tag.

FIG. 3 is a flow chart relating to the read process.

The present process starts when the power to the operation apparatus 23 is turned on and supplied to the transmission/reception apparatus 34 which is connected thereto.

Referring to FIG. 3, first, in step S1, the microcomputer 41 receives a read instruction from the operation unit 37 or the software operating in PC 32.

In S2, the microcomputer 41 makes the transmission/reception apparatus 34 transmit a radio wave to an IC tag(s) in response to the read instruction received in the S1, supplies an IC tag(s), which can receive the radio wave, with the power without a contact and also accesses the IC tag(s) for reading setup information therefrom.

In S3, the microcomputer 41 stores the setup information (i.e., transmission data of the IC tag(s)) read in the S2 in the RAM 43 comprised by the operation apparatus 23.

Note that if an IC tag exists at a position for being able to receive the radio wave transmitted from the transmission/reception apparatus 34, the IC tag activates itself by extracting a minute electric current from the received radio wave and returns a response to the transmission/reception apparatus 34. The response method to the transmission/reception apparatus 34 is generally called a back scatter system.

Pieces of setup information read from all of the IC tags capable of receiving the radio wave transmitted from the transmission/reception apparatus 34 are stored in the RAM 43 comprised by the operation apparatus 23.

In S4, the microcomputer 41 reads the setup information stored in the RAM 43 in the S3.

In S5, the microcomputer 41 displays (i.e., reflects) the setup information which has been read in the S4 in a corresponding part of the display screen of a display unit of the PC 32, followed by deleting the displayed setup information from the RAM 43. Note that, if setup information of a unit comprised by another of the same product whose setup information is retained by an IC tag attached to the aforementioned product existing in the neighborhood of the present system in the S2, resulting in reading setup information of units comprised by a plurality of the same products in the S4, then the plural pieces of setup information is displayed in the display unit comprised by the operation unit 37 or the one comprised by the PC 32 so as to have the user select the setup information of the unit which is equipped in the present system. By so doing, even if setup information of a unit comprised by the same product is read from the IC tag equipped in the unit comprised by the same product other than the unit equipped in the present system, it is possible to select only the setup information of the unit equipped in the present system. Then, the setup information selected in this event is displayed in the corresponding part of the display screen of the PC 32, followed by deleting the displayed setup information and that of the same product from the RAM 43.

In S6, the microcomputer 41 judges whether or not any setup information is left in the RAM 43 (i.e., whether or not the RAM 43 is empty) and, if the judgment result is "no" (i.e., setup information is left in the RAM 43), the control returns to the S4 for reading setup information within the RAM 43 again. Contrarily, if the judgment result is "yes" (i.e., setup information is not left in the RAM 43), effecting that setup information of all the IC tags are read, the process of the present flow ends.

The present embodiment is configured to equip the TV adaptor lens 20 and intermediate lens tube 12 with the IC tags 33a and 33b, respectively, enabling a readout of setup information of the product name, magnification, production serial number of the TV adaptor lens 20 and intermediate lens tube 12 from the IC tags 33a and 33b, respectively, and a display (i.e., a reflection) of these pieces of information in the corresponding parts of the display screen of the PC 32.

The next is a description of examples of equipping the IC tags 33a and 33b and of setup information read therefrom by referring to FIGS. 4A and 4B.

FIG. 4A is an illustration diagram of the TV adaptor lens 20 and intermediate lens tube 12 equipped with the IC tags 33a and 33b, respectively.

As shown in FIG. 4A, the IC tag 33a retaining the setup information of the TV adaptor lens 20 is equipped in the back thereof. And the IC tag 33b (not shown herein) retaining the setup information of the intermediate lens tube 12 is equipped internally therein.

The transmission/reception apparatus 34 is equipped on the side surface of the lens tube which is internally equipped with the beam splitter 13, and therefore the IC tags 33a and 33b are desirably installed as close to the transmission/reception apparatus 34 as possible. The IC tag 33a equipped on the TV adaptor lens 20 is installed at a lower position of the TV adaptor lens 20 connecting to the lens tube comprising the beam splitter 13. Meanwhile, the IC tag 33b of the intermediate lens tube 12 is attached to the upper position of the intermediate lens tube 12 connecting to the lens tube comprising the beam splitter 13. Thus equipping IC tags close to the transmission/reception apparatus 34 makes it possible to read the respective setup information of two IC tags 33a and 33b by means of a single transmission/reception apparatus 34. The readout setup information is transmitted from the transmission/reception apparatus 34 to the operation apparatus 23 by way of a cable and stored therein as described above.

FIG. 4B is a diagram showing pieces of setup information, which are read from the respective IC tags 33a and 33b, of the TV adaptor lens 20 and intermediate lens tube 12. The above described step S3 shown in FIG. 3 retains these pieces of setup information in the RAM 43 of the operation apparatus 23.

If a manual operation unit (i.e., the TV adaptor lens 20 and intermediate lens tube 12 in the case of the present embodiment) is changed anew, it is necessary to reactivate the transmission/reception apparatus 34 by issuing a read instruction from the software operating in the PC 32 or the operation unit 37 in order to make the changed manual operation unit recognized following the installation thereof in the light path because the transmission/reception apparatus 34 is not configured to communicate with an IC tag continuously as the process shown in FIG. 3. The read instruction in this event may be by means of a button on the operation unit 37 or of an instruction from the software operating in the PC 32.

The intermediate lens tube 12 according to the present embodiment is a magnification change apparatus. The intermediate lens tube 12 has the purpose of increasing the number of binocular tubes by dividing the light path into a plurality thereof, as well as the function of a magnification change apparatus. The above description assumes an intermediate magnification for the intermediate lens tube 12 as the fixed 1× and one IC tag 33b to be equipped on the intermediate lens tube 12, it is, however, possible to attach an IC tag 33b to each optical element having intermediate magnification comprised by the intermediate lens tube 12. A description is accordingly provided for an example installation of the IC tags 33b in such a case by referring to FIGS. 5A, 5B and 5C.

FIGS. 5A, 5B and 5C are diagrams describing an example of attaching the IC tags 33b to an intermediate lens tube 12 comprising a plurality of optical elements of intermediate magnifications mounted into the mounting holes of the inside of a turret form.

Note that the present embodiment installs the transmission/reception apparatus 34 in the rear of the intermediate lens tube 12 and also on the top surface of a projector tube 52 close to a connecting position of the intermediate lens tube 12 to the projector tube 52 comprising the cube unit 11, as shown in FIGS. 5B and 5C, so as to obtain the product name, magnification, production serial number, et cetera, of an optical element from the IC tag 33b attached to the optical element inserted into the light path 51 in the intermediate lens tube 12.

As shown in FIGS. 5A and 5B, each of the optical elements placed into the mounting holes of the inside of the turret form is equipped with a corresponding IC tag 33b. In this case, however, the configuration is such that the IC tag 33b attached to the optical element inserted into the light path 51 is close to the transmission/reception apparatus 34 which is installed externally to the intermediate lens tube 12. Note that the IC tag 33b used in this event utilizes a short distance-use IC tag. This configuration makes it possible to read only information retained by the IC tag 33b installed on the optical element inserted into the light path 51 among a plurality of optical elements placed into the mounting holes of the inside of the turret form. Alternatively possible is to configure so as to read only information retained by an IC tag 33b attached to an optical element inserted into the light path 51 by using a radio wave shield member.

The present embodiment is configured so that, when either of a plurality of optical elements installed into the mounting holes of the inside of the turret form in the intermediate lens tube 12 is inserted into the light path 51, an IC tag 33b comes closest to the transmission/reception apparatus 34, thereby enabling a transmission of the setup information of the optical element inserted into the light path 51. Note that the power is supplied to the transmission/reception apparatus 34 mounted externally to the intermediate lens tube 12 from the operation apparatus 23 by way of a cable. The setup information transmitted from the IC tag 33b is received by the transmission/reception apparatus 34, transferred to the operation apparatus 23 and stored therein. If an instruction is issued from the software operating in the PC 32 in this event, the setup information stored in the operation apparatus 23 is transferred to the PC 32 and reflected to (i.e., displayed in) the display screen of the display unit by the software.

Note that the two manual operation units, i.e., the TV adaptor lens 20 and intermediate lens tube 12, are located close to each other in the present embodiment, and therefore only one transmission/reception apparatus 34 is sufficient; if, however, another unit is equipped with another IC tag, another transmission/reception apparatus 34 is added and installed so as to be close to the newly added IC tag. If another microscope system equipped with an IC tag exists in the vicinity of the present system, a transmission/reception with a target IC tag is secured by installing a radio wave shield so as not to receive information of an IC tag equipped in the other microscope system.

As described above, the microscope system according to the present embodiment is configured to equip a manual operation unit with an IC tag that is a noncontact type storage medium, thereby making it possible to obtain not only information of an electrically connected unit (i.e., an electrical operation unit) but also that of a manual operation unit automatically. Therefore, it eliminates a work for a manual input by the user or a mistake due to a manual input, enabling an improvement of the work efficiency.

Note that various modification examples are conceivable for the microscope system according to the present embodiment as described in the following.

For example, it may be a manual operation microscope system in lieu of an electrical microscope system put forth in the present embodiment. However, the above described operation apparatus 23, operation unit 37 and PC 32 are included even if a manual operation microscope is premised.

Meanwhile, the present embodiment exemplifies the TV adaptor lens 20 and intermediate lens tube 12 as target units equipped with the IC tags; such a target, however, may be other manual operation unit (e.g., a lens tube, lamp housing, projection tube, et cetera) without being connected by a cable. Also, positions for installing an IC tag and a transmission/reception apparatus are not limited to the positions as described above, provided that the IC tag and transmission/reception apparatus are installed within a range enabling an exchange of information between the IC tag and transmission/reception apparatus while considering that a radio wave intensity is inversely proportional with the square of distance.

The present embodiment can also be applied to an intermediate lens tube that is a lever featured variable magnification change apparatus as an intermediate lens tube that is a variable magnification change apparatus. Accordingly, the next is a description of an application example in this case by referring to FIGS. 6A and 6B.

FIGS. 6A and 6B are diagrams describing an example of attaching IC tags to an intermediate lens tube that is a push lever-featured variable magnification change apparatus. The present example is configured to install a transmission/reception apparatus 34 on the side surface of an intermediate lens tube 12' (refer to FIG. 6B) and also on the upper part of a projector tube 52 in the vicinity of a connecting position between the intermediate lens tube 12' and the projector tube 52 comprising a cube unit 11 or on the lower part of the lens tube comprising a beam splitter 13 in the vicinity of a connecting position between the intermediate lens tube 12' and the lens tube comprising the beam splitter 13, thereby obtaining the product name, magnification, production serial number of an optical element from the IC tag attached to the optical element inserted into the light path 51 in the intermediate lens tube 12'.

As shown in FIGS. 6A and 6B, each optical element installed into the mounting holes of the inside of the lever form is equipped with a corresponding IC tag 33b. In this case, however, the installation of it is such that the IC tag 33b attached to the optical element inserted into the light path 51 is close to the transmission/reception apparatus 34 mounted onto the side surface of the intermediate lens tube 12'. The IC tag 33b used here is also a short distance-use IC tag. This configuration makes it possible to read only information of the IC tag 33b attached to the optical element inserted into the light path 51 among them attached to a plurality of the optical elements installed into the mounting holes of the inside of a lever form. Alternatively possible is to configure so as to read only information retained by an IC tag 33b attached to an optical element inserted into the light path 51 by using a radio wave shield member.

Incidentally in the installation example of the IC tag 33b described by using FIGS. 6A and 6B, and FIGS. 5A, 5B and 5C, alternatively possible configuration is to have these IC tags 33b comprise the power source for enabling a continuous transmission of information (e.g., magnification information, et cetera), and shield radio waves emitted from the IC tags 33b attached to the optical elements other than the one inserted into the light path 51 so as to transmit externally the setup information of an optical element inserted into the light path 51, thereby enabling the IC tag 33b attached to the optical element inserted into the light path 51 to externally transmit easily.

The microscope system according to the present embodiment is also applicable to either of an erect image microscope system and an inverted microscope system.

The present embodiment is configured to obtain information of a unit by using an IC tag, it may alternatively be configured to obtain information of a part of units by using a barcode, however.

The present embodiment may also be configured to equip the PC 32 or operation apparatus 23 with a read button so as to read from an IC tag at every time the aforementioned button is pressed.

In the read process of an IC tag according to the present embodiment, a read instruction is issued from the operation unit 37 or the software operating in the PC 32, it may alternatively configured to have the operation apparatus 23 per se issue the read instruction.

Also, in the read process of an IC tag according to the present embodiment, it may be alternatively configured to display, and operate, setup information stored in the RAM 43 comprised by the operation apparatus 23 in the display unit of the operation unit 37 which is connected to the operation apparatus 23.

Meanwhile, an installation position of the transmission/reception apparatus 34 according to the present embodiment may be changed to another position in lieu of being limited to the positions shown in FIGS. 5B, 5C and 6B. An example installation in this case is described by using FIG. 7.

Figure 7:
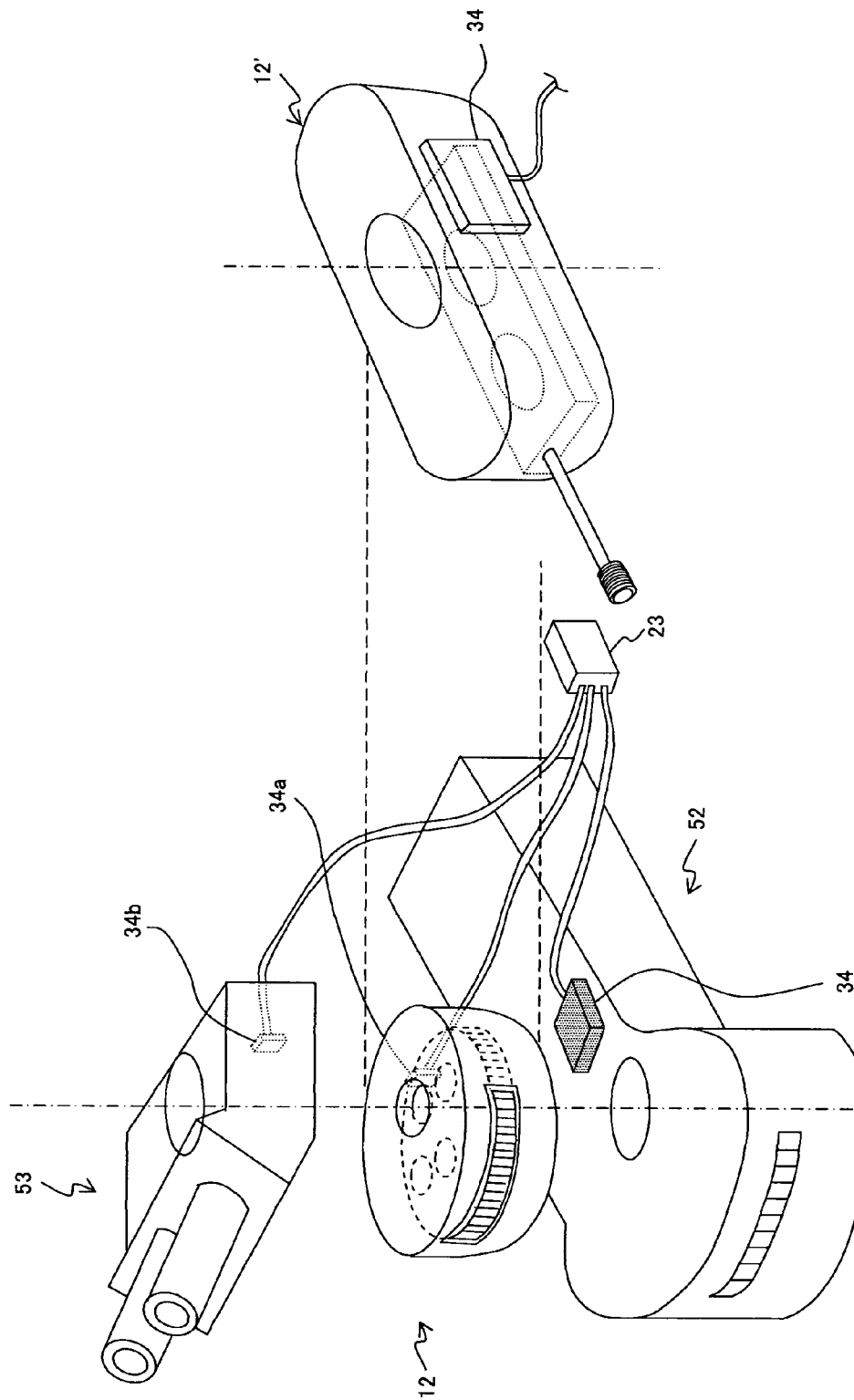
FIG. 7 is a diagram showing another example of installing a transmission/reception apparatus.

FIG. 7 is a diagram showing another example of installing the transmission/reception apparatus 34.

As shown in FIG. 7, the transmission/reception apparatus 34 may be installed on the upper surface of the projector tube 52 and at the same time on a side surface close to the light path of the intermediate lens tube 12 (i.e., a transmission/reception apparatus 34a shown in FIG. 7), or close to the light path of the intermediate lens tube 12 and at the same time on a side surface of a lens tube 53 comprising a beam splitter 13 (i.e., a transmission/reception apparatus 34b shown in FIG. 7). In addition to installing the transmission/reception apparatus 34 on the upper surface of the projector tube 52 described in FIGS. 5B and 5C, and on the side surface of the intermediate lens tube 12' described in FIG. 6B. Incidentally, in the case of installing the transmission/reception apparatus 34a on the side surface of the intermediate lens tube 12, a work is required for reinstalling the transmission/reception apparatus 34 every time the intermediate lens tube 12 is changed; the assumption here, however, is that such an installation may be possible if the aforementioned work is negligible. And a transmission/reception apparatus installed in these positions are supplied with the power from the operation apparatus 23 by way of a cable.

The present embodiment may also be alternatively configured to install the transmission/reception apparatus 34 at a position far from the IC tag by using a long distance-use transmission/reception apparatus in place of installing it close to an equipped IC tag. Accordingly, the next is a description of a comprisal and of an operation of the present system in such a case by referring to FIGS. 8 and 9.

Figure 8:
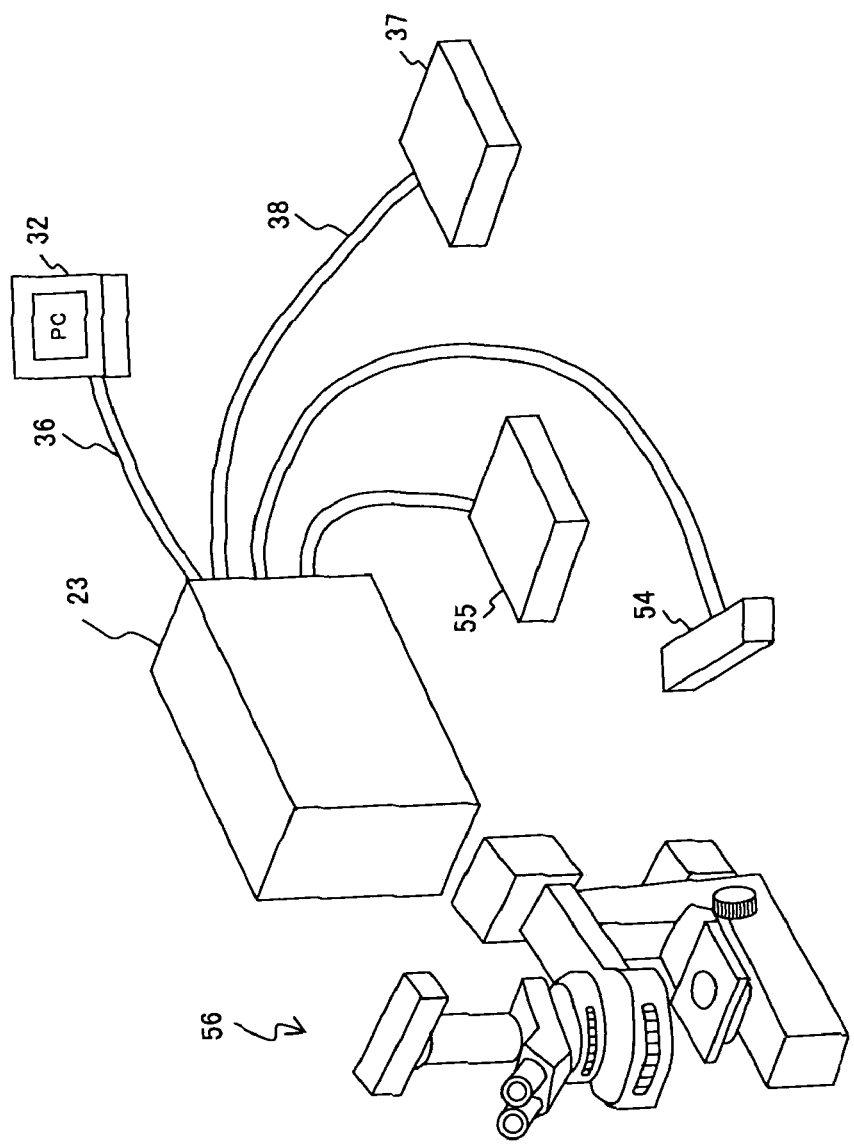
FIG. 8 is a diagram showing an outline comprisal of a microscope system in the case of using a transmission/reception apparatus used for a long distance.

FIG. 8 is a diagram showing an outline comprisal of the present system in the case of using a transmission/reception apparatus used for a long distance.

As shown in FIG. 8, in the case of the present example using a long distance-use transmission/reception apparatus

54, an IC tag utilizes a readable and writable IC tag. The system according to the present example has a write dedication apparatus 55, which performs a write to an IC tag non-contactingly, connected to the operation apparatus 23. The write dedication apparatus 55 is configured to be capable of writing a code, which is unique to the operation apparatus 23 (noted as "unique code" hereinafter), to a readable/writable IC tag. The premise here, however, is that a write of a unique code to the IC tag is only possible when the write dedication apparatus 55 is close to the IC tag. This configuration enables the IC tag and the write dedication apparatus 55 to be communicable only in close proximity, and therefore a problem of an unintended write to an IC tag by error does not occur even if another unit equipped with an IC tag exists in the vicinity. Note that a unique code may be one unique to a microscope apparatus 56, in addition to one unique to the operation apparatus 23.

Figure 9A:
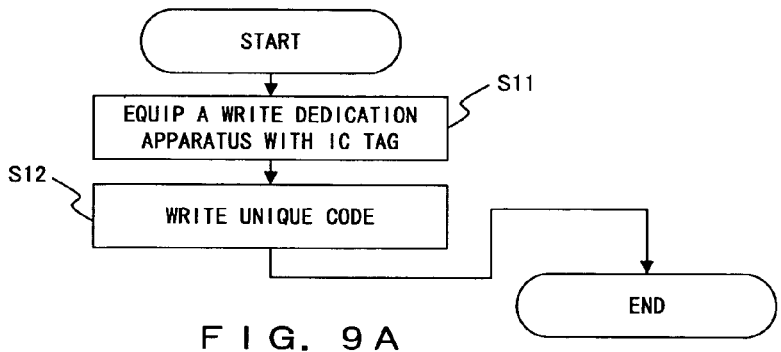
FIG. 9A is a first flow chart showing an operation of a microscope system in the case of using a transmission/reception apparatus used for a long distance.
Figure 9B:
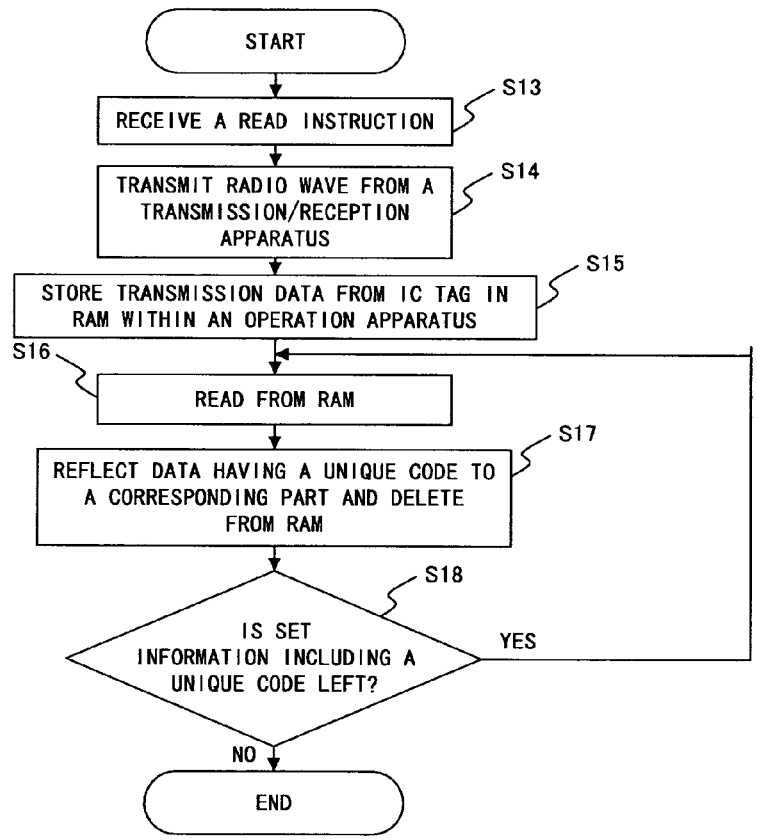
FIG. 9B is a second flow chart showing an operation of a microscope system in the case of using a transmission/reception apparatus used for a long distance.
Figure 9C:
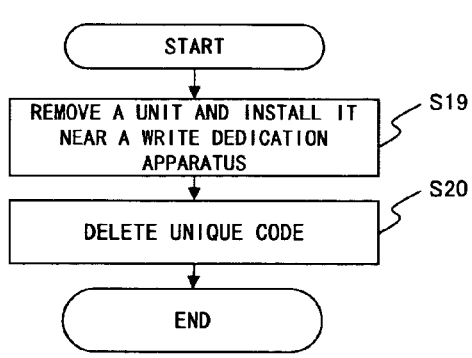
FIG. 9C is a third flow chart showing an operation of a microscope system in the case of using a transmission/reception apparatus used for a long distance.

FIGS. 9A, 9B and 9C are a flow chart showing an operation of the present system in the case of using a transmission/reception apparatus used for a long distance. Note that the process relating to the present operation is also carried out by the microcomputer 41 comprised by the operation apparatus 23, except where requiring a user operation.

The process shown in FIG. 9A is a process for writing a unique code to an IC tag, which starts at the time of turning on the power in the operation apparatus 23.

Referring to FIG. 9A, first, the user installs a readable/writable IC tag close to the write dedication apparatus 55 in S11. Note that the present step is a preparatory operation for writing a unique code. While the write dedication apparatus 55 can be installed close to an IC tag which is attached to the outer side of a unit, that which is attached internally and only appears to the front when the applicable optical element is inserted into the light path, such as the intermediate lens tube 12, is to be moved close to the write dedication apparatus 55 in the state of the applicable optical element being inserted into the light path. These works are to be carried out manually by the user.

As the user gives a write instruction through the operation unit 37, or to the software operating in the PC 32, it transmits the write instruction to the operation apparatus 23, and the write dedication apparatus 55 writes a unique code to a nearby IC tag in S12.

As such, the process shown in FIG. 9A writes the unique code to the IC tag.

The process shown in FIG. 9B is one for reading an IC tag. The process starts when the power of the operation apparatus 23 is turned on and the long distance-use transmission/reception apparatus 54 is activated.

Referring to FIG. 9B, first, In S13, the microcomputer 41 receives a read instruction from the operation unit 37 or the software operating in the PC 32.

In S14, the microcomputer 41 makes the transmission/reception apparatus 54 transmit a radio wave to an IC tag(s) in response to the read instruction received in the S13, supplies an IC tag(s) capable of receiving the radio wave with the power non-contactingly and also accesses the IC tag(s) for reading setup information therefrom.

In S15, the microcomputer 41 stores the setup information (i.e., the transmission data from the IC tag) read in the S14 in the RAM 43 comprised by the operation apparatus 23. The present step stores all pieces of setup information of all the IC tags existing close to the transmission/reception apparatus 54. Since the present example uses a long distance-use transmission/reception apparatus 54, the setup information of all the IC tags existing close thereto are indiscriminately read and stored.

In S16, the microcomputer 41 reads the setup information stored in the RAM 43 in S15.

In S17, the microcomputer 41 displays (i.e., reflects) only setup information including the unique code in the corresponding part of the display screen of the PC 32 among the setup information read in the S16. That is, the present step also discerns the unique code and deletes the displayed setup information from the RAM 43.

In S18, the microcomputer 41 judges whether or not any setup information including a unique code is left within the RAM 43. If the judgment result is "yes" (i.e., setup information including a unique code is left in the RAM 43), returns to the S16 in order to read setup information including a unique code within the RAM 43 again. Contrarily, if the judgment result is "no" (i.e., setup information including a unique code is not left in the RAM 43), resulting in setup information of all the IC tag being read, it ends the present process.

As such, the process shown in FIG. 9B carries out a readout process of IC tags. Incidentally, in the case of removing (i.e., not using) a unit of which the IC tag is written with a unique code, the process of deleting the unique code as shown in FIG. 9C is carried out. The present process also starts up when the power of the operation apparatus 23 is turned on.

Referring to FIG. 9C, first, the user removes the unit of which the IC tag is written with the unique code and installs the IC tag close to the write dedication apparatus 55 in the step S19. Note that the installation method on the IC tag is similar to the S11 shown in FIG. 9A. This enables a secure communication with the IC tag.

In S20, the written unique code is deleted from the IC tag. The deletion of the unique code is carried out by a prescribed button operation on the operation unit 37, or the software operating on the PC 32 activating the deletion program followed by a prescribed button operation to instruct for deleting the unique code.

As such, the process shown in FIG. 9C deletes the unique code from the IC tag.

Incidentally, in the case of mounting the removed unit on the microscope apparatus 56 again, the process shown in FIG. 9A is carried out. And, in the case of using a long distance-use transmission/reception apparatus 54 as in the present example, the configuration is to always start with the process shown in FIG. 9B, followed by obtaining the latest information of a unit installed in the microscope apparatus 56.

While the present embodiment describes by exemplifying the TV adaptor lens 20 and intermediate lens tube 12 as manual operation units for attaching the IC tags, an alternative configuration may attach an IC tag to a unit allowing an insertion by a user. An example of optical element allowing a detachable attachment is a cube unit 11. In the case of attaching an IC tag to the cube unit 11, the IC tag is desirably a readable/writable IC tag, which is configured to retain information such as excitation wavelength, absorption wavelength, production serial number and product name as setup information, and enable the user to write information constituting a pair with a reagent for a fluorescent sample as write information. That is, the IC tag is configured to retain a product name, production serial number, excitation wavelength, et cetera, as fixed information and enable the user to input a reagent name, et cetera, as write information. Such a configuration enables the user to confirm which cube unit is inserted into the light path simultaneously with turning the power on and also write as to which cube unit corresponds to the sample in observation can be made by him/herself. This configuration saves time of searching a position of the cube unit inserted into the cube turret, and makes it possible to write as to which cube turret corresponds to which reagent to the IC tag, thus enabling an improvement of work efficiency.

Embodiment 2

The next is a description on a microscope system according to the embodiment 2 of the present invention.

The microscope system according to the present embodiment is characterized as reflecting information read from an IC tag to a photographed image.

In the comprisal of the microscope system according to the present embodiment, the same component sign is attached to the same component as the microscope system according to the embodiment 1, with the description being omitted here.

And the microscope system according to the present embodiment presumably comprises manual operation units, e.g., a TV adaptor lens 20 and an intermediate lens tube 12, which are configured as:

TV adaptor lens 20: 0.25×
Intermediate lens tube 12: 2× (i.e., 1× to 2×)

While not shown in a drawing, the TV adaptor lens 20 and intermediate lens tube 12, that is, manual operation units, are installed in the light path, as in the case of the embodiment 1. A transmission/reception apparatus 34 is equipped on the upper part of a projector tube including a cube unit 11, and an IC tag 33a is attached to the lower part of the TC adaptor lens 20. An IC tag 33b is attached to each corresponding optical element as described as a modified example of the embodiment 1 by referring to FIGS. 5A, 5B and 5C, or FIGS. 6A and 6B. Each IC tag 33 stores magnification information, et cetera, corresponding to the optical element. This configuration makes it possible to read the magnification information of the optical element inserted into the light path.

Note that an installation position of the transmission/reception apparatus 34 is possible to change variously as described by referring to FIG. 7.

The transmission/reception apparatus 34 reads information from the IC tags 33a and 33b. Information read by the transmission/reception apparatus 34 is transferred to an operation apparatus 23 and retained therein.

The next is a description of the processes for reading information from the IC tags and reflecting it to a photographed image which are executed by a microcomputer 41 comprised by the operation apparatus 23.

Figure 10:
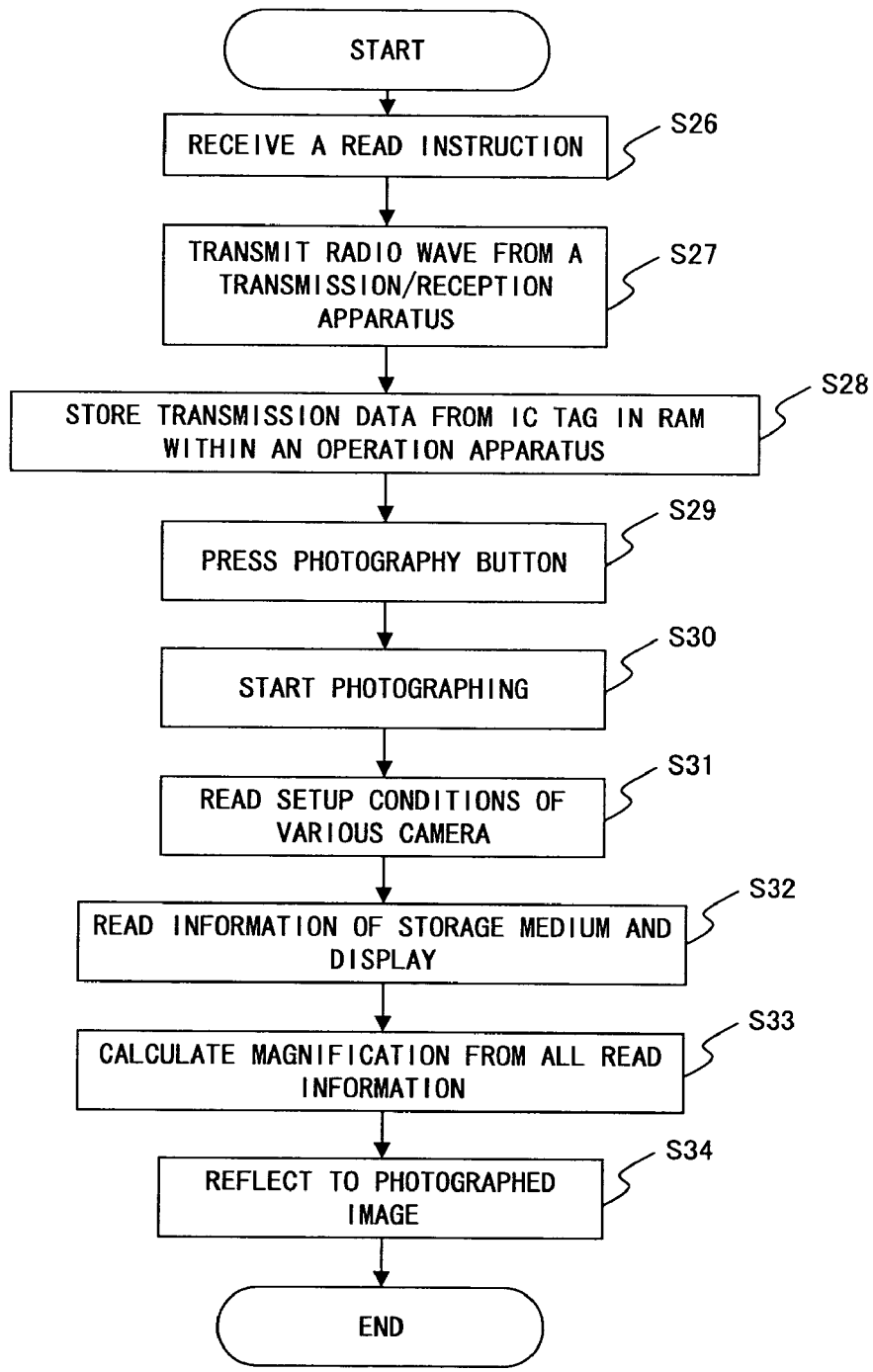
FIG. 10 is a flow chart related to a process for reading information from an IC tag to reflect it to a photographed image.

FIG. 10 is a diagram showing a flow chart related to the processes.

The present process starts when the power for the operation apparatus 23 is turned on and the power is supplied to the transmission/reception apparatus 34, which is connected thereto.

Referring to FIG. 10, first, S26 through S28 performs the processes similar to those of the S1 through S3 shown in FIG. 3, a description of which are omitted here.

In S29, the microcomputer 41 receives an instruction transmitted from an operation unit 37 in response to a pressing of a photographing button comprised thereby, or an instruction from the software operating in a PC 32. This makes the operation apparatus 23 issue a photographing instruction to a digital camera 21.

In S30, the digital camera 21 picks up an image (photographs) according to the photographing instruction from the operation apparatus 23, then the obtained photographed image is transferred to the PC 32 and displayed in the display screen of the display unit by means of software operating in the PC 32.

In S31, the microcomputer 41 obtains a setup condition (i.e., exposure time, CCD size, binning, et cetera) at the time of the digital camera 21 picking up an image in the S30 and has the software operating in the PC 32 reflect (i.e., display) it to the display screen where the photographed image is already displayed. Note that the present step reads all setup conditions of the digital camera 21, transfers the setup information to a photography control unit 25 by way of a cable 35 and further to the PC 32 to be processed.

In S32, the microcomputer 41 reads information (including magnification information) of the IC tag 33a attached to the TV adaptor lens 20, the information (including magnification information) of the IC tag 33b attached to an optical element inserted into the light path in the intermediate lens tube 12, stored in RAM 43 in step S28, and the display information used in the PC 32. Note that the display information is obtained from software operating in the PC 32 (such as the operating system). In the present step, the process for reading the information of IC tag stored in RAM 43 is carried out in a manner similar to the processes of the S4 through S6 shown in FIG. 3 for example.

In S33, the microcomputer 41 calculates a magnification of the photographed image by using magnification information included in the information of the IC tag read in the S32 and the display information, and has the software operating in the PC 32 reflect to (i.e., displays in) the display screen a total magnification ratio as a combination with an object lens 9.

Incidentally, the total magnification ratio can be calculated by the following expression (1):

Total magnification ratio=(object lens magnification)* (intermediate magnification lens tube)*(TV adaptor lens)*(monitor screen diagonal length)/ (photographing element diagonal length)    (1)

As described above, the photographing condition of the present embodiment is that TV adaptor lens 20: 0.25× and the intermediate lens tube 12: 1× to 2×. And the (monitor screen diagonal length)/(photographing element diagonal length) (i.e., an image size, which is imaged in a TV monitor (i.e., a CRT monitor) used as the display unit of the PC 32, divided by a TV screen total magnification ratio) can be obtained from the electronic magnification table shown in FIG. 11A. FIG. 11B shows a table of common CCD sizes.

Assuming the CCD size of the digital camera 21 to be ⅓, and using the above photographing condition, the maximum total magnification ratio and minimum total magnification ratio can be calculated using the expression (1) as follows:

Maximum total magnification ratio=(object lens magnification)*61.4(2*0.25*122.8); and Minimum total magnification ratio=(object lens magnification)*9.525(1*0.25*38.1).

Note that the object lens magnification information is read from a frame control unit 26, transferred to the operation apparatus 23 by way of a cable 24 and stored therein, followed by being transferred to the PC 32 by way of a cable 36 and displayed in (i.e., reflected to) the display screen by means of the software operating in the PC 32.

In S34, the microcomputer 41 adds the setup condition obtained in the S31, the information read from the IC tags 33a and 33b in the S32, the total magnification ratio information obtained by the calculation in the S33 to the photographed image obtained in the S30, and records the resultant in a predetermined recording medium as one image file. Incidentally, the predetermined recording medium may be a recording medium comprised by the operation apparatus 23 or one comprised by the PC 32 for example.

As described above, the process shown in FIG. 10 reads the respective magnifications of the object lens 9 on the light path, TV adaptor lens 20 and intermediate lens tube 12, makes the microcomputer 41 comprised by the operation apparatus 23 calculate, makes the software operating in the PC 32 reflect (i.e., display) the total magnification ratio to (in) the display screen, and adds the total magnification ratio, the setup information of the digital camera 21 et cetera, to be stored as an image file, which are always prompted by a pressing of a photography button as trigger.

As described above, the microscope system according to the present embodiment is capable of adding information related to a photographing condition, one related to a manual operation unit and one including information related to the total magnification ratio to a photographed image, thereby making it possible to obtain an improved reproducibility of the photographed image from the information added thereto at a later occasion and improve the work efficiency, in addition to the benefit stated in the embodiment 1. This configuration also eliminates a user work related to recording and inputting the photographing setup, et cetera, and a mistake of the user in recording and inputting such data.

Note that the microscope system according to the present embodiment can conceivably be modified as described in the following.

For instance, information related to the present system, such as information of an electrical operation unit, information related to a user (e.g., photographer information) and date/time information, and information of own writing of the user may be added as information adding to a photographed image in the present embodiment.

While the present embodiment is configured to use a TV (i.e., a CRT) monitor as the display unit of the PC 32 and the value of the TV monitor for calculating the total magnification ratio, a thin film transistor (TFT) monitor may be used in place of the TV monitor and the value of the TFT monitor may be used for calculating the total magnification.

Also, a part of the IC tags may be replaced by a barcode in the present embodiment.

Meanwhile, the microscope system according to the present embodiment is capable of obtaining an improved reproducibility of a photographed image from information added to the photographed image as described above. The process in such a case is described by referring to FIG. 12. Note that the present process is one executed by the microcomputer 41 comprised by the operation apparatus 23, except for operations by a user.

Figure 12:
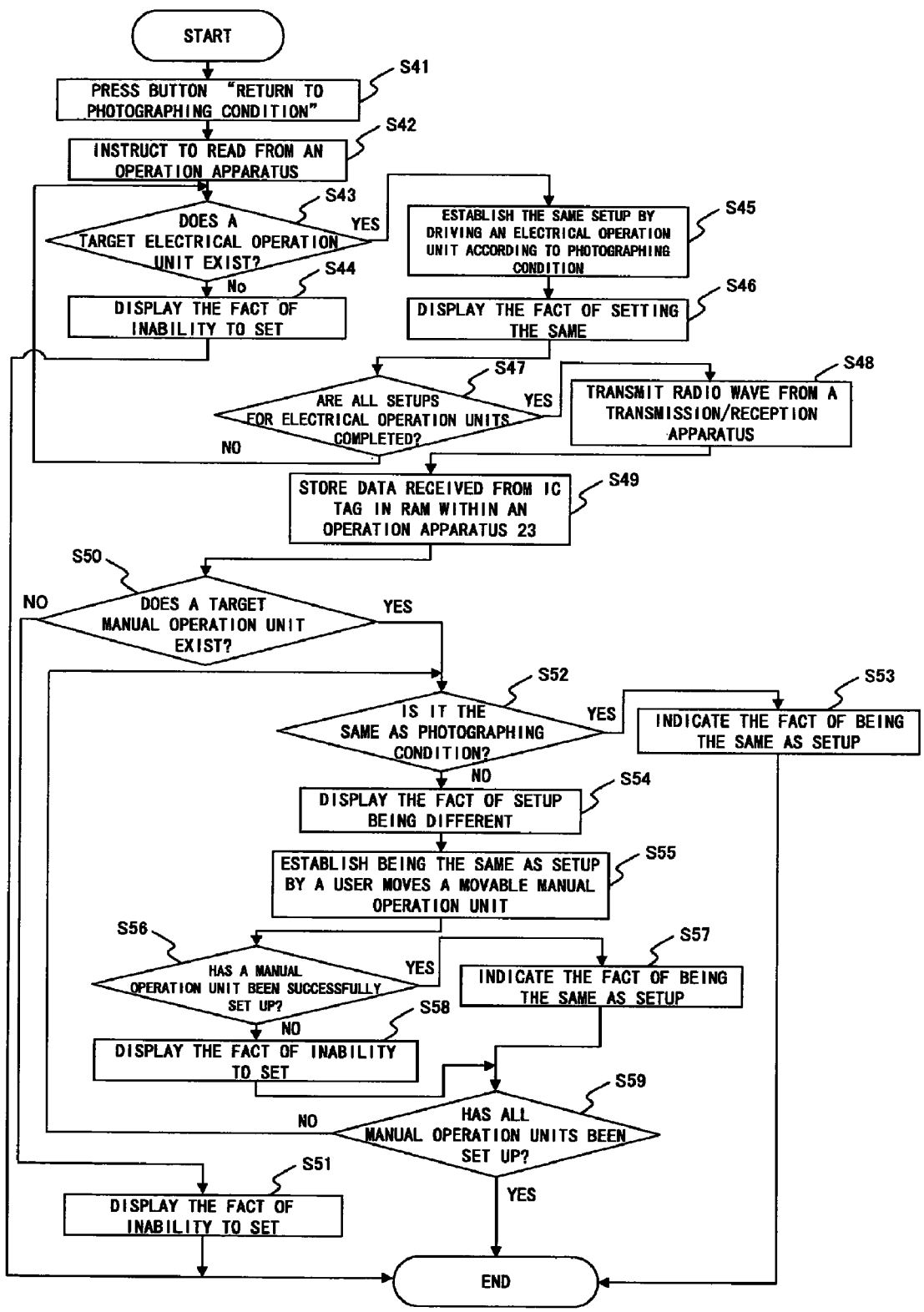
FIG. 12 is a flow chart related to a process for reproducing the same observation system from information attached to a photographed image.

FIG. 12 is a flow chart related to a process for reproducing the same observation system from information attached to a photographed image.

The present process starts when the present system is supplied with the power and an image file of a photographed image, from which the same observation system is desirably reproduced, is selected by a user through the software operating in the PC 32. An assumption here is that setup information of an electrical operation unit at the time of photographing is also added to the photographed image of the selected image file in this event.

Referring to FIG. 12, first, the PC 32 transmits a "return to photography condition" to the operation apparatus 23 in response to the user pressing of a "return to photography condition" button in the software operating in the PC 32 in the step S41. This may be alternatively configured to initiate from the operation unit 37.

In S42, the microcomputer 41 issues a read instruction to each control unit and obtains setup information of each electrical operation unit therefrom.

In S43, the microcomputer 41 compares the setup information of an electrical operation unit, which is included in the information added to the photographed image read from the selected image file, with the setup information of each electrical operation unit obtained in the S42 to judge whether or not exists the same electrical operation unit as one at the time of photographing the photographed image of the selected image file.

If the judgment result of the S43 is "no", then in the subsequent S44, the microcomputer 41 displays the fact of being unable to set the same electrical operation unit in the display screen of the display unit of the PC 32 and ends the process of the present flow.

Contrarily, if the judgment result of the S43 is "yes", then in the subsequent S45, the microcomputer 41 establishes the same setup by driving an electrical operation unit according to the setup information (i.e., a photographing condition) included in the selected image file.

In S46, the microcomputer 41 displays, in the display screen of the display unit of the PC 32, the fact of the electrical operation unit in the same setup.

In S47, the microcomputer 41 judges whether or not all the electrical operation unit have been established in the same setup according to the setup information (i.e., the photographing condition) of the electrical operation units included in the selected image file.

If the judgment result of the S47 is "no", the control returns to the S43 and repeat the above described processes.

Contrarily, if the judgment result of the S47 is "yes", then in the subsequent S48, the microcomputer 41 makes the transmission/reception apparatus 34 emit a radio wave.

In S49, the microcomputer 41 reads setup information from an IC tag and stores it in the RAM 43 comprised by the operation apparatus 23. Note that the present example is configured to attach the IC tag to a manual operation unit.

In S50, the microcomputer 41 compares one or more piece (s) of the setup information of a manual operation unit (s), which is/are included in the added information to the photographed image which is read from the selected image file, with one or more pieces of the setup information of the manual operation unit(s) stored in the S49 and judges whether or not exists the same manual operation unit at the time of photographing the photographed image of the selected image file.

If the judgment result of the S50 is "no", then in the subsequent S51, the microcomputer 41 displays, in the display screen of the display unit of the PC 32, the fact of being unable to set the same manual operation unit, and ends the processes of the present flow.

Contrarily, if the judgment result of the S50 is "yes", then in the subsequent S52, the microcomputer 41 compares the setup information of the manual operation unit, which is read from the selected image file, with the setup information of the manual operation unit stored in the S49, and judges whether or not the photographing conditions are the same.

If the judgment result of the S52 is "yes", then in the subsequent S53, the microcomputer 41 displays, in the display screen of the display unit of the PC 32, the fact of (i.e., being the same as the setup) the same manual operation unit being set, and the process of the present flow ends.

Contrarily, if the judgment result of the S52 is "no", then in the subsequent S54, the microcomputer 41 displays, in the display screen of the display unit of the PC 32, the fact of a different manual operation unit being set (i.e., a setup being different). Note that the present step may be configured to display as to which is a different manual operation unit and also which manual operation unit shall be set for making the same photographing condition.

In S55, the user performs the operation of moving the differently set manual operation unit for establishing the same setup thereof.

In S56, the microcomputer 41 judges whether or not the manual operation unit is set in the same manner as the setup information the manual operation unit read from the selected image file. Note that for making this judgment, it is necessary to read setup information from the IC tag again after the user moves the manual operation unit in the S55. The timing for reading the setup information in this event may be either one of the following two. One is to have the transmission/reception apparatus 34 always emits a radio wave and obtains setup information of the manual operation unit in the present light path. The other is to issue an instruction to have the transmission/reception apparatus 34 emit a radio wave every time the user moves a manual operation unit and obtain setup information thereof accordingly.

If the judgment result of the S56 is "yes", then in the subsequent S57, the microcomputer 41 displays, in the display screen of the display unit of the PC 32, the fact of (i.e., being the same as the setup) the same manual operation unit being set, and proceeds to S59.

Contrarily, if the judgment result of the S56 is "no", then in the subsequent S58, the microcomputer 41 displays, in the display screen of the display unit of the PC 32, the fact of the same manual operation unit being not set, and proceeds to S59.

In S59, the microcomputer 41 judges whether or not all the manual operation unit have been put in the same setup according to the setup information (i.e., the photographing condition) of the manual operation unit included in the selected image file.

If the judgment result of the S59 is "yes", the process related to the present flow ends.

Contrarily, if the judgment result of the S59 is "no", the control returns to the S52 for repeating the above described processes.

As described above, the process shown in FIG. 12 makes it possible to accomplish the same observation system with a high reproducibility as one at the time of photographing from the information added to the photographed image, and obtain an improved reproducibility of the photographed image.

Embodiment 3

The next is a description on a microscope system according to the embodiment 3 of the present invention.

The microscope system according to the present embodiment is characterized as using a readable/writable transmission/reception apparatus and IC tag to display a life of a lamp precisely.

In the microscope system according to the present embodiment, the same component sign is attached to the same component as that of the microscope system according to the embodiment 1, and the description thereof is omitted here.

FIG. 13 is a diagram showing a partial comprisal of the microscope system according to the present embodiment.

Referring to FIG. 13, a lamp house 61 is internally equipped with a transmission illumination-use light source 1 comprising a halogen lamp. An IC tag 62 is attached onto the side surface of the lamp house 61. A transmission/reception apparatus 63 is located nearby the lamp house 61, and the transmission/reception apparatus 63 is connected to an operation apparatus 23 by way of a cable 64. Enabled is, the information retained in the IC tag 62 is read by the transmission/reception apparatus 63, transferred to the operation apparatus 23 by way of the cable 64, retained in the operation apparatus 23, and further displayed in a display screen of a display part by means of the software operating in a PC 32 by way of a cable 36.

The IC tag 62 retains a lit time of a halogen lamp (named as "lamp lit time" hereinafter) in the inside of the lamp house 61 as writable information in addition to setup information such as a product name, production serial number, et cetera. A lamp lit time retained in the IC tag 62 is updated by incrementing +1 at every passage of one minute of the lit time of the halogen lamp. Note that, in the case of replacing the halogen lamp itself, the lamp lit time retained in the IC tag 62 needs to be initialized. An instruction for the initialization is issued from the PC 32 or operation unit 37 connected to the operation apparatus 23.

The next is a description of the process for reading and writing a lamp lit time from and to the IC tag 62, which is executed by the microcomputer 41 comprised by the operation apparatus 23.

FIG. 14 is a diagram showing a flow chart related to the process.

The present process starts when the power for the operation apparatus 23 is turned on, and the power is supplied to the transmission/reception apparatus 63 which is connected thereto.

Referring to FIG. 14, first, in S66, the microcomputer 41 judges whether or not an IC tag 62 exists. This judgment is made by the transmission/reception apparatus 63 emitting a radio wave and, if a communication becomes possible with an IC tag 62, then it is judged to exist.

If the judgment result of the S66 is "no", then in the subsequent S67, the information effecting that an IC tag 62 does not exist is displayed by means of software operating in the PC 32, thus ending the process related to the present flow.

Contrarily, if the judgment result of the S66 is "yes", then in the subsequent S68, the microcomputer 41 reads a lamp lit time retained by the IC tag 62, and in the subsequent S67, the information of the readout lamp lit time is displayed as a past control-light lit time in the display screen by means of the software operating in the PC 32.

In S69, a pulse in one minute interval is generated during the halogen lamp lighting (i.e., during a light control) within the lamp house 61. Note that the one-minute interval pulse is made to generate by the microcomputer 41 comprised by the operation apparatus 23. Since the lighting of the halogen lamp is controlled by a frame control unit 26, it transmits a signal indicating the lighting of the halogen lamp to the microcomputer 41 during the time of the halogen lamp being lit. The microcomputer 41 generates the one-minute interval pulse only when there is the signal indicating the lighting from the frame control unit 26.

In S70, the current lamp lit time is updated as:

(Past lamp lit time)+1=(the current lamp lit time);

for every one minute of elapsed time based on the pulse generated during a lighting of the halogen lamp, and has the transmission/reception apparatus 63 transmit the current lamp lit time as write information to the IC tag 62. By this, the lamp lit time retained in the IC tag 62 is overwritten and updated.

In S71, the lamp lit time written in the S70 is displayed in the display screen continuously by means of the software operating in the PC 32. This configuration enables the user to confirm a precise lamp lit time continuously.

In S72, the microcomputer 41 has the IC tag 62 hold the lamp lit time overwritten in the S70 except for during a light control of the halogen lamp within the lamp house 61.

In S73, the microcomputer 41 judges whether or not the power is turned on for the operation apparatus 23.

If the judgment result of the S73 is "yes", the control returns to the S70 for repeating the above described processes.

Contrarily, if the judgment result of the S73 is "no", the process related to the present flow ends.

As described above, the process shown in FIG. 14 carries out a reading and writing of the lamp lit time from and to the IC tag 62 attached to the lamp house 61.

As such, the microscope system according to the present embodiment is configured to use a readable/writable IC tag for the lamp house, thereby making it possible to obtain a precise total lit time of a halogen lamp even if it is used in a unit, that is, a lamp house, which can be connected to any microscope systems, enabling a simple and easy notification of replacement timing of the halogen lamp due to the turn-on life, for example, to the user and an improvement of the work efficiency.

Note that various modified examples can be considered for the microscope system according to the present embodiment as described in the following.

In the present embodiment, equipment positions of the readable/writable IC tag 62 and transmission/reception apparatus 63 are not limited as described above, for example.

Also, the present embodiment is configured to display the information read from the IC tag 62 in the display screen by means of the software operating in the PC 32; it may, however, be alternatively configured to display by means of a display unit equipped in the operation unit 37 connected to the operation apparatus 23.

Also, the present embodiment may alternatively be configured to connect the PC 32 to the Internet so as to transmit a lamp lit time to an external apparatus by way of the Internet. This configuration makes it possible to transmit the lamp lit time to a remote apparatus by way of the Internet for example. Or, it is possible to transmit the lamp lit time to a server operated by the halogen lamp manufacturer so that the server judges whether the end of life is close from the lamp lit time and, if the lamp is judged to be close to the end of life, a message indicating it is transmitted to the PC 32 to be displayed in the display screen thereof. Also, the operation apparatus 23 may alternatively be configured to obtain information such as the frequency of lighting and the lighting output of a halogen lamp, in addition to the lamp lit time, and transmit these pieces of information to an external apparatus by way of the Internet.

Also, the present embodiment is configured to attach the IC tag 62 to the halogen lamp, the light source, however, may be constituted by a light emitting diode (LED), to which the IC tag 62 is attached. In this case, a readable/writable IC tag is installed on an LED mounting board in which such pieces of information as the lit time, spectral characteristic, temporal change, et cetera, of the LED are retained. And these pieces of information are read by an externally located readable/writable transmission/reception apparatus 63 and transmitted to, and stored in, an operation apparatus 23 connected thereto.

Also, the present embodiment is configured to attach the IC tag to the halogen lamp, it may, however, be alternatively configured to attach an IC tag to another light source. It may be configured to attach IC tags to those units requiring a replacement when a certain usage time elapses, in addition to the light sources.

Also, the present embodiment may alternatively be configured to replace a part of IC tags with barcodes in the case of placing a plurality of IC tags.

Such is the descriptions of the embodiments 1, 2 and 3.

At this point, a description, by referring to FIGS. 15A, 15B, 15C and 15D, is on a specific example of the case of not recognizing (i.e., not using) setup information which is read from another system by means of writing a unique code to an IC tag, as described for the embodiment 1 by referring to FIGS. 8, 9A and 9B.

Figure 15A:
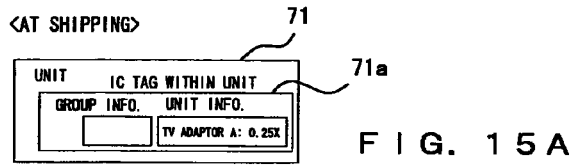
FIG. 15A is a first diagram describing a specific example in the case of not recognizing (i.e., not using) information read from another microscope system.

FIG. 15A is a diagram showing information stored in an IC tag attached to a unit at the time of shipping out of the factory. As shown in FIG. 15, an IC tag 71a attached to a unit 71 includes a group information storage zone capable of reading group information (which corresponds to the above described unique code), that is, the information unique to a microscope system, and a zone storing unit information. However, nothing is written to the group information storage zone at the time of shipping out of the factory.

Incidentally, the present example assumes a TV adaptor lens as the unit 71 and that the IC tag 71a stores a unit name "TV adaptor A" and a magnification "0.25×", et cetera, as unit information.

Figure 15B:
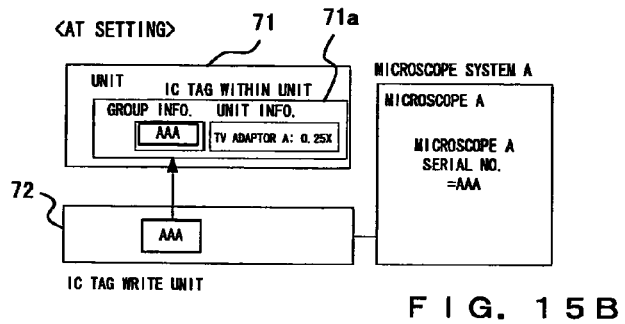
FIG. 15B is a second diagram describing a specific example in the case of not recognizing (i.e., not using) information read from another microscope system.

FIG. 15B is a diagram showing an operation at the time of setting (i.e., at setting) the unit 71 to the microscope system A (corresponding to the microscope system shown in FIG. 8). Note that the operation corresponds to the operation shown in FIG. 9A. As shown in FIG. 15B, an IC tag write unit (corresponding to the write dedication apparatus 55) 72 comprised by the microscope system A writes the serial number "AAA" of the microscope system A, which is the information unique thereto, as group information to the group information storage zone of the IC tag 71a in this event.

Figure 15C:
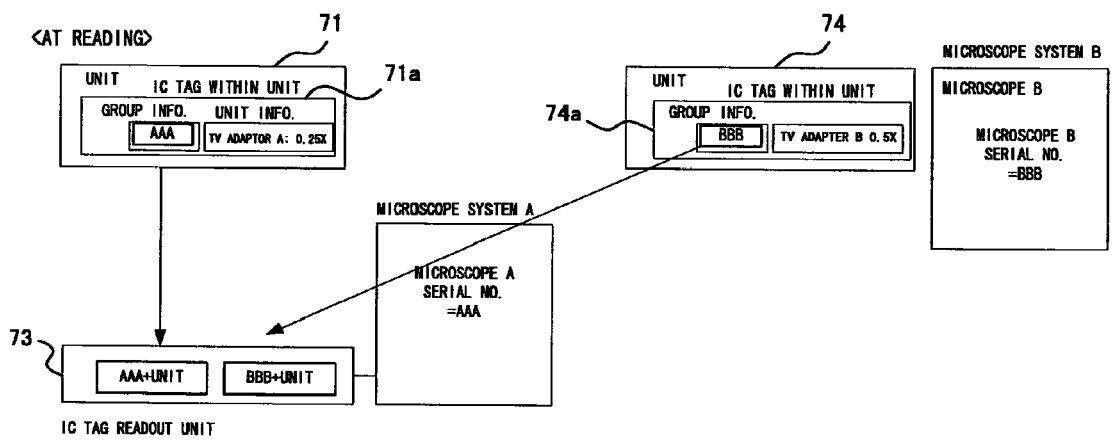
FIG. 15C is a third diagram describing a specific example in the case of not recognizing (i.e., not using) information read from another microscope system.

FIG. 15C is a diagram showing an operation at the time of reading information stored in the IC tag 71a attached to the unit 71 which is set to the microscope system A. Note that the operation corresponds to the S13 through S15 shown in FIG. 9B. As shown in FIG. 15C, an IC tag readout unit (corresponding to the transmission/reception apparatus 54) 73 comprised by the microscope system A reads the group information and unit information (i.e., "AAA+unit" which are stored by the IC tag 71a in this event. As shown in FIG. 15C, if another microscope system B which is the similar microscope system equipped with a unit 74 exists nearby the microscope system A, however, the IC tag readout unit 73 also ends up reading the group information and unit information (i.e., "BBB+unit") which are stored in the IC tag 74a attached to the unit 74.

Incidentally the IC tag 74a stores the serial number "BBB" of the microscope system B as group information in a similar manner as the operation described by referring to FIG. 15B. Also, the IC tag 74a stores the unit name "TV adaptor B", the magnification "0.5×", et cetera, as unit information.

Figure 15D:
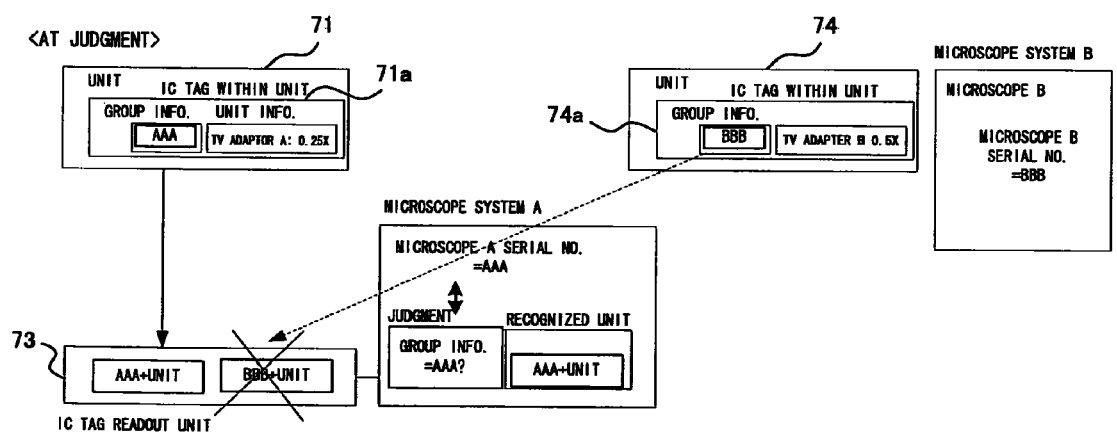
FIG. 15D is a fourth diagram describing a specific example in the case of not recognizing (i.e., not using) information read from another microscope system.

FIG. 15D is a diagram showing an operation at the time of not recognizing (i.e., not using) unit information other than that of a unit set to the microscope system A by means of a judgment based on the group information read by the IC tag readout unit 73. Incidentally, this operation corresponds to the S16 through S18 shown in FIG. 9B.

As shown in FIG. 15D, the microscope system A judges whether or not the group information read by the IC tag readout unit 73 is identical with the serial number of the microscope system A in this event and, if it is judged to be identical, recognizes the group information and unit information simultaneously read therewith, while if it is judged to be not identical, does not recognize (i.e., does not use) the group information and unit information simultaneously read therewith. Incidentally a unit making the judgment corresponds to the operation apparatus 23 or PC 32.

The writing of the group information unique to the present microscope system to the IC tag attached to the unit at setting as described above prevents an erroneous recognition even if the unit information is read from the unit comprised by a similar microscope system existing nearby. Therefore, there is no possibility of erroneously recognizing the unit information of a nearby microscope system even in a situation where a similar microscope system exists nearby, such as a laboratory and screening room.

Note that there are other methods for preventing an erroneous recognition of unit information related to a nearby similar microscope system in addition to the methods described by referring to FIGS. 15A, 15B, 15C and 15D. At this point, a description is on one example of the methods by referring to FIGS. 16A, 16B, 16C and 16D.

Figure 16A:
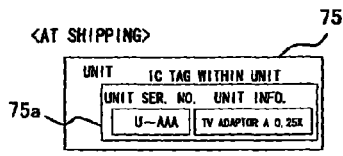
FIG. 16A is a first diagram describing another specific example in the case of not recognizing (i.e., not using) information read from another microscope system.

FIG. 16A is a diagram showing information stored in an IC tag attached to a unit at the time of shipping out of the factory. As shown in FIG. 16A, the IC tag 75*a* attached to the unit 75 stores the unit serial number (i.e., the unit S/N) "U-AAA" and unit information that is the information unique to the unit 75.

Also the assumption for the present example is, the unit 75 is a TV adaptor lens and that the IC tag 75*a* stores the unit name "TV adaptor A", magnification "0.25×", et cetera, as unit information.

Figure 16B:
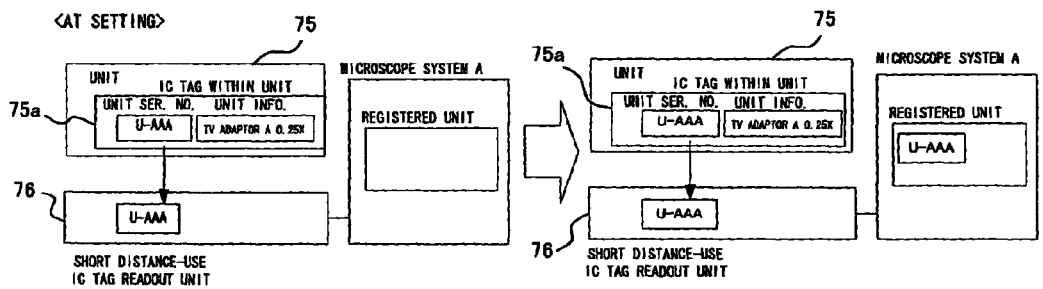
FIG. 16B is a second diagram describing another specific example in the case of not recognizing (i.e., not using) information read from another microscope system.

FIG. 16B is a diagram showing an operation at the time of setting (i.e., at setting) the unit 75 to the microscope system A (corresponding to the microscope system shown in FIG. 8).

The assumption for the present example is, the microscope system A comprises a short distance-use IC tag readout unit 76 capable of reading information only from an IC tag existing nearby; in addition to a later described long distance-use IC tag readout unit (corresponding to the transmission/reception apparatus 54) capable of reading information from an IC tag existing in relatively distant positions.

As shown in FIG. 16B, the short distance-use IC tag readout unit 76 comprised by the microscope system A reads the unit serial number "U-AAA" stored in the IC tag 75*a* in this event. This readout is carried out in the state of the short distance-use IC tag readout unit 76 being close to the IC tag 75*a*. The microscope system A stores the unit serial number which is read by the short distance-use IC tag readout unit 76 in a predetermined storage medium, thereby registering the unit serial number of the unit 75 which is set to the microscope system A. Incidentally, a unit for registering a unit serial number corresponds to the operation apparatus 23 or PC 32, a predetermined storage medium storing the unit serial number corresponds to the RAM 43 comprised by the operation apparatus 23 or a storage medium (not shown herein) comprised by the PC 32.

Figure 16C:
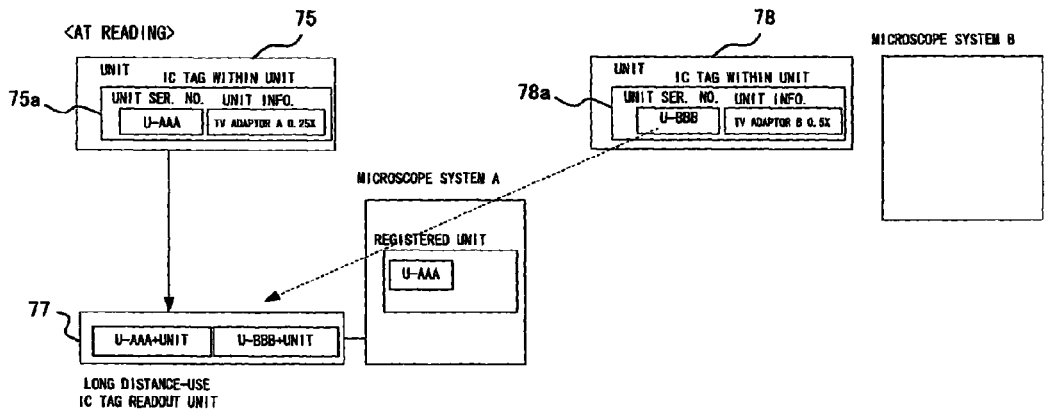
FIG. 16C is a third diagram describing another specific example in the case of not recognizing (i.e., not using) information read from another microscope system.

FIG. 16C is a diagram showing an operation at the time of reading information stored in the IC tag 75*a* attached to the unit 75 which is set to the microscope system A. As shown in FIG. 16C, a long distance-use IC tag readout unit 77 reads the unit serial number and unit information (i.e., "U-AAA+unit") which are stored by the IC tag 75*a* in this event. If another microscope system B, which is a similar microscope system to which a unit 78 is set, exists close to the microscope system A as shown in FIG. 16C, however, the long distance-use IC tag readout unit 77 ends up reading the unit serial number and unit information (i.e., "U-BBB+unit") which are stored by an IC tag 78*a* attached to the unit 78.

Incidentally, the IC tag 78*a* stores the unit serial number "U-BBB" of the unit 78 as information unique to the unit 78 in the same manner as the operation described by referring to FIG. 16B. Also, the IC tag 78*a* stores the unit name "TV adaptor B" and magnification "0.5×", et cetera, as unit information.

Figure 16D:
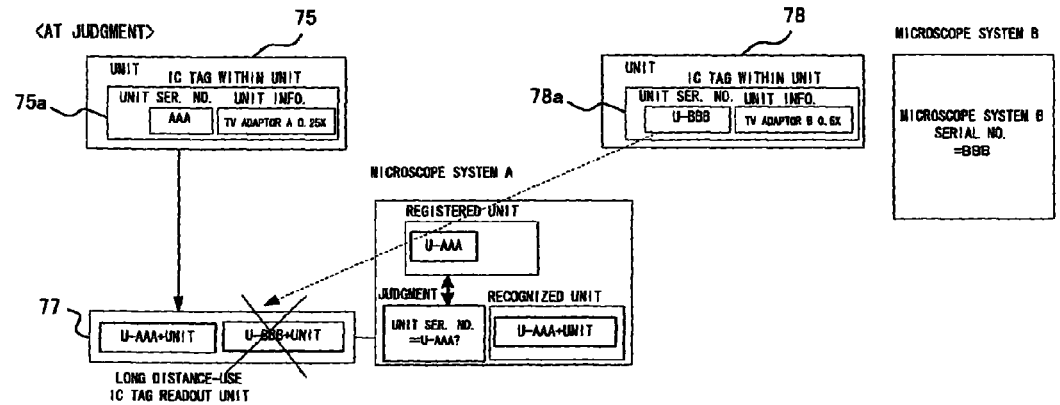
FIG. 16D is a fourth diagram describing another specific example in the case of not recognizing (i.e., not using) information read from another microscope system.

FIG. 16D is a diagram showing an operation at the time of not recognizing (i.e., not using) unit information other than that of a unit set to the microscope system A by means of a judgment based on the serial number read by the long distance-use IC tag readout unit 77. As shown in FIG. 16D, the microscope system A judges whether or not the unit serial number read by the long distance-use IC tag readout unit 77 is identical with the unit serial number registered in the microscope system A in this event and, if it is judged to be identical, recognizes the unit serial number and unit information read therewith, while if it is judged to be not identical, does not recognize (i.e., does not use) the unit serial number and unit information read therewith. Note that the unit making the judgment corresponds to the operation apparatus 23 or PC 32.

The registering of the unit serial number of a unit which is set at setting in the microscope system as described above prevents an erroneous recognition even if the unit information is read from the unit comprised by a similar microscope system existing nearby. Therefore, there is no possibility of erroneously recognizing the unit information of a nearby microscope system even in a situation where a similar microscope system exists nearby.

Note that the present embodiment is configured to register only a unit serial number in a microscope system; it may be, however, alternatively configured to register it along with unit information.

The next is a description, by referring to FIG. 17, of a specific example of the case of reading information of only the currently used optical element from among a unit comprising a plurality thereof as described for the embodiment 1 by referring to FIGS. 5A, 5B and 5C, et cetera.

FIG. 17 is a diagram showing the specific example. Note that the present example is described by exemplifying a cube turret comprising two cubes (corresponding to the cube unit 11 shown in FIG. 1) as unit comprising a plurality of optical elements.

As shown in FIG. 17, the cube turret 79 comprises two cubes 80 and 81, which are configured in a manner that either of the two is insertable to the light path when being set to the microscope system. The cube 80 is equipped with a short distance-use IC tag 80*a* storing optical element information (i.e., CUBE-A) of the cube 80, while the cube 81 is equipped with a short distance-use IC tag 81*a* storing optical element information (i.e., CUBE-B) of the cube 81.

The cube turret 79 also comprises a short distance-use IC tag readout apparatus 82 capable of reading information only from a nearby existing short distance-use IC tag. The short distance-use IC tag readout apparatus 82 is installed in a manner to be placed at a position close to the light path when the cube turret is set to the microscope system, enabling a reading of the information of only an IC tag attached to a cube which is inserted into the light path (i.e., the currently used cube).

The cube turret 79 is also equipped with a long distance-use IC tag 79*a* comprising a zone storing the information which is read by the short distance-use IC tag readout apparatus 82 and a zone storing the unit information (i.e., a CUBE turret A) of the cube turret 79.

In the case of a long distance-use IC tag readout unit 83 (corresponding to the transmission/reception apparatus 54), which is capable of reading information from a long distance-use IC tag that is comprised by the microscope system A and that exists at a relatively distant position, reading information of the cube inserted into the light path when setting such configured cube turret 79 to the microscope system A (corresponding to the microscope system shown in FIG. 1), an operation is carried out as follows.

First, in the cube turret 79, the short distance-use IC tag readout unit 82 reads the optical element information from the short distance-use IC tag attached to the cube inserted into the light path to be stored in the long distance-use IC tag 79*a*.

Incidentally, the assumption here for the present example is, the cube 81 is inserted into the light path. Therefore, the optical element information (i.e., CUBE-A) is read only from the short distance-use IC tag 81*a* attached to the cube 81 to be stored in the long distance-use IC tag 79*a*.

Then, the long distance-use IC tag readout unit 83 comprised by the microscope system A reads the optical element information (i.e., CUBE-A) and unit information (i.e., CUBE turret A) of the cube 81 from the long distance-use IC tag 79*a* to be recognized by the microscope system A.

Such operation makes it possible to recognize the information of only the cube inserted into the light path and accordingly prevent from recognizing the information of a cube which is not inserted into the light path (i.e., not currently used).

Note that in the present example, the short distance-use IC tags 80*a* and 81*a* and the short distance-use IC tag readout unit 82 constitute a system which is independent from, and which never interferes with, one constituted by the long distance-use IC tag 79*a* and long distance-use IC tag readout unit 83.

The next is description of a few application examples of information stored in an IC tag.

The embodiment 1 is configured to store information, such as the product name, magnification, production serial number, et cetera, in IC tags respectively attached to units such as TV adaptor lens and intermediate lens tube 12, and read it at a predetermined timing for displaying it; it may be, however, possible to store, for example, information of the material in the IC tag, read it at a predetermined timing, refer to a table which is comprised by the microscope system and which shows a correlation between the material information and its discarding method, and present (e.g., display) the discarding method according to the material information to the user. Discarding methods for a material are usually different in countries or regions. If a table showing a correlation between material information and the discarding method is made ready for each country and region that the microscope system is or will be used, a user is easily able to know the discarding method for the applicable place.

Note that such a correlation table is supplied by a manufacturer of the applicable unit. The present example is configured to incorporate a correlation table between the material information and its discarding method; it may be, however, also configured to use a correlation table between the production serial number unique to a unit and its discarding method for example. In such a case, it is no longer necessary to secure a zone for storing material information in an IC tag. It is of course possible to configure an IC tag to store information on discarding. An alternative configuration may be to read a production serial number stored in an IC tag, transmit it to a server of the manufacturer of the unit by way of a network (e.g., the Internet) and inquire a discarding method, so that the discarding method obtained from the server can be presented to the user.

Also possible is, for example, if a unit equipped with an IC tag is one comprising firmware, that is, a unit comprising a central processing unit (CPU) and ROM (corresponding to the operation apparatus 23 for example) storing a program to be executed by the aforementioned CPU, to store version information of the program in the IC tag, transmit the version information read in a predetermined timing to a server of the program manufacturer by way of a network (e.g., the Internet) and also inquire the necessity of a newer version, so that the newer version can be presented (e.g., displayed) to the user on an as required basis. This configuration enables the user to easily know the necessity of a newer version. Note that the present example is configured to notify a necessity of a newer version; alternatively, it is also possible to so configure as to update to a newer version by an automatic downloading of a necessary program from the server on an as required basis as a result of an inquiry for a necessity of a newer version, for example. This configuration enables the user to utilize the latest version of the program without operating for obtaining a newer version. Incidentally, the version information stored in the IC tag is also updated to the version information of a post-update program in this case.

Meanwhile, the embodiment 3 is configured to store information of the total lit time of the halogen lamp, which is kept updated according to the lighting thereof, in the IC tag attached to the lamp house 61, and notify a replacement time of the halogen lamp based on the information of the total lit time; it is likewise possible to configure to attach IC tags to the units being specified for replacement timings according to the number of times of driving, such as the revolver 10 and epi-illumination-use shutter 17, store information of the respective total numbers of times of driving, which are kept updated according to the driving of the respective units, and notify the replacement timings of the respective units based on the information of the total number of times of driving. Note that information of the total number of times of driving which is stored in an IC tag is kept updated every time the applicable unit is driven so that the total number of times of driving is incremented accordingly in this case. Also possible is to transmit the information of the total number of times of driving which is read at a predetermined timing to a server of the unit manufacturer by way of a network (e.g., the Internet) and also inquire a replacement time of the unit, so that it is possible to notify the user of the replacement time obtained by the server.

As such, the descriptions on the embodiments 1, 2 and 3 are provided. In each of the embodiments, the process carried out by the operation apparatus 23 can also be done by the PC 32, which is the same for each of the modified examples.

For the comprisal and operation according to each of the embodiments, it is also possible to configure by combining the comprisal and operation of each embodiment, which is the same for each of the modified examples.

It is also possible to configure by combining the comprisal and operation between an embodiment and a modified example.

The present invention is thus far described in detail; the present invention, however, may of course be improved or changed in various manners possible within the scope thereof, in lieu of being limited to the above described embodiments.

As described above, the present invention is contrived to use a noncontact type storage medium, thereby enabling the automatic recognition of information of a manual operation unit and the automatic input and setup of a unit configuration that used to be performed manually. Also contrived is to add information of a manual operation unit to a photographed image, thereby making it possible to obtain an improved reproducibility of the photographed image. Further contrived is to use a readable/writable noncontact type storage medium, thereby making it possible to retain and update past information and reduce a work and mistake of the user, even the storage medium is used anywhere, thus improving the work efficiency.

What is claimed is:

1. A microscope system comprising:
   a microscope body including an optical element which is selectively mounted and which attributes to a setup of an observation condition;

a first noncontact type storage medium which is provided to the optical element, and which stores information related to the optical element, wherein a noncontact readout of information from the first noncontact type storage medium is performed from outside of the optical element;

a first readout unit which reads the information non-contactingly from the first noncontact type storage medium;

a display unit which displays the information related to the optical element read by the first readout unit;

an image pickup unit which picks up an image via the optical element; and a photography information obtainment unit which obtains photography information including setup information of the image pickup unit at a time of picking up the image;

wherein the display unit further displays the image picked up by the image pickup unit and information which is read by the first readout unit and which is related to the selectively mounted optical element at a time of picking up the image.

2. The microscope system according to claim 1, wherein the display unit further displays the photography information obtained by the photography information obtainment unit.

3. The microscope system according to claim 1, further comprising:

a recording unit which adds to the image picked up by the image pickup unit the information which is read by the first readout unit and which is related to the optical element at the time of picking up the image, and the photography information obtained by the photography information obtainment unit, and which records the image with said information read by the first readout unit and said photography information added thereto.

4. The microscope system according to claim 3, further comprising:

a process unit which carries out a process to perform a same setup as a setup of the image pickup unit and the optical element at the time of picking up the image recorded by the recording unit with said information read by the first readout unit and said photography information added thereto, based on said information read by the first readout unit and said photography information.

5. The microscope system according to claim 1, further comprising:

a second noncontact type storage medium, which is provided to a replacable unit of the microscope system which requires a replacement when a total usage time exceeds a predefined length of time, wherein a noncontact readout of information from the second noncontact type storage medium is performed from outside of the unit, and a noncontact writing of information to the second noncontact type storage medium is performed from outside of the unit; and a read/write unit which reads and writes information from and to the second noncontact type storage medium, wherein the read/write unit reads and writes a total usage time of the unit from and to the second noncontact type storage medium, and wherein the display unit displays the total usage time of the unit which is read by the read/write unit.

6. The microscope system according to claim 5, wherein the replacable unit comprises a lamp used as a light source.

7. The microscope system according to claim 1, further comprising:

a write unit which writes information non-contactingly to said first noncontact type storage medium, wherein the write unit writes group information unique to the microscope system to the first noncontact type storage medium.

8. The microscope system according to claim 7, wherein the first readout unit reads both the information related to the optical element and the group information, from the first noncontact type storage medium.

9. The microscope system according to claim 1, further comprising:

a judgment unit which judges whether or not group information, which is stored in the first noncontact type storage medium and which is read by the first readout unit along with the information related to the optical element, is identical to group information unique to the microscope system, wherein the information related to the optical element read by the first readout unit along with the group information is not used if the judgemetn unti judges that the group information read by the first readout unit and the group information unique to the microscope system are not identical.

10. The microscope system according to claim 1, wherein the first readout unit further reads, from noncontact type storage mediums which are within a readable range of the first readout unit and which are respectively provided to optical elements, group information along with information related to the optical elements;

wherein the microscope system further comprises:

a write unit which writes group information unique to the microscope system non-contactingly to the first noncontact type storage medium; and a judgment unit which judges whether or not the group information, which is read by the first readout unit along with the information related to the optical elements, is identical to the group information unique to the microscope system;

wherein the information related to the optical element read by the first readout unit along with the group information is not used if the judgment unit judges that the group information read by the first readout unit and the group information unique to the microscope system are not identical.

11. The microscope system according to claim 1, wherein the first noncontact type storage medium further stores information unique to the optical element.

12. The microscope system according to claim 11, further comprising:

a second readout unit which reads information non-contactingly from the first noncontact type storage medium, wherein the second readout unit reads the information unique to the optical element from the first noncontact type storage medium.

13. The microscope system according to claim 12, further comprising a registration unit which registers the information unique to the optical element which is read by the second readout unit.

14. The microscope system according to claim 13, wherein the first readout unit reads both the information related to the optical element and the information unique to the optical element, from the first noncontact type storage medium, and further reads, from noncontact type storage mediums provided to optical elements within a readable range of the first readout unit, information unique to the optical elements.

15. The microscope system according to claim 14, further comprising:

a judgment unit which judges whether or not the information unique to the optical element read by the first readout unit along with information related to the optical element is registered by the registration unit, wherein the information related to the optical element read by the first readout unit along with the information unique to the optical element is not used if the judgment unit judges that the information unique to the optical element is not registered.

16. The microscope system according to claim 1,
wherein the first noncontact type storage medium further stores information unique to the optical element;
wherein the system further comprises:
   a second readout unit which reads the information unique to the optical element non-contactingly from the first noncontact type storage medium;
   a registration unit which registers the information unique to the optical element read by the second readout unit; and
   a judgment unit which judges whether or not information unique to the optical element read by the first readout unit along with information related to the optical element is registered by the registration unit,
wherein the information related to the optical element read by the first readout unit along with the information unique to the optical element is not used if the judgment unit judges that the information unique to the optical element is not registered.

17. The microscope system according to claim 12, wherein the first readout unit is a readout unit for a long distance, and the second readout unit is a readout unit for a short distance.

18. The microscope system according to claim 1, further comprising:
   an optical element unit comprising a plurality of the optical elements,
   a second noncontact type storage medium, provided to the optical element unit, wherein a noncontact readout of information from the second noncontact type storage medium is performed from outside of the optical element unit; and
   a second readout unit which reads information non-contactingly from the second noncontact type storage medium,
wherein:
   the first readout unit reads information related to an optical element which is in use from the first noncontact type storage medium equipped in the optical element from among the plurality of optical elements included in the optical element unit,
   the second noncontact type storage medium stores the information related to the optical element read by the first readout unit, and
   the second readout unit reads information related to the optical element from the second noncontact type storage medium.

19. The microscope system according to claim 18, wherein:
   the first noncontact type storage medium is a short distance noncontact type storage medium,
   the first readout unit is a short distance readout unit,
   the second noncontact type storage medium is a long distance noncontact type storage medium, and
   the second readout unit is a long distance readout unit.

20. The microscope system according to claim 1, wherein the first readout unit collectively reads information of respective optical elements stored in a plurality of first noncontact type media provided to the optical elements in response to a one-time external read instruction.

* * * * *